(12) United States Patent
Sims et al.

(10) Patent No.: US 7,360,611 B2
(45) Date of Patent: Apr. 22, 2008

(54) FLOW SYSTEM FOR A HYDRAULIC CHOKE SOLIDS STRAINER

(75) Inventors: Donald Glynn Sims, Houston, TX (US); Michael James Taylor, Tomball, TX (US); Robert Frank Schmidt, Cypress, TX (US); David Anthony Schmidt, Houston, TX (US); John Walton McCaskill, Jersey Village, TX (US)

(73) Assignee: Expro Americas, L.P., Houston, TX (US)

( * ) Notice: Subject to any disclaimer, the term of this patent is extended or adjusted under 35 U.S.C. 154(b) by 0 days.

(21) Appl. No.: 11/805,328

(22) Filed: May 23, 2007

(65) Prior Publication Data

US 2007/0221413 A1    Sep. 27, 2007

Related U.S. Application Data

(62) Division of application No. 10/880,640, filed on Jun. 30, 2004, now abandoned.

(60) Provisional application No. 60/485,187, filed on Jul. 7, 2003.

(51) Int. Cl.
*E21B 21/06* (2006.01)
*E21B 21/10* (2006.01)
*B01D 35/02* (2006.01)
*F16K 11/085* (2006.01)

(52) U.S. Cl. ............... 175/206; 175/207; 175/218; 166/75.12; 166/229; 137/547; 137/625.32; 210/422; 210/309

(58) Field of Classification Search .......... 175/206, 175/207, 209, 218, 312; 166/75.12, 229, 166/265, 267; 137/546, 547, 625.32, 625.47; 210/309, 422, 446, 459
See application file for complete search history.

(56) References Cited

U.S. PATENT DOCUMENTS

| | | | | |
|---|---|---|---|---|
| 1,646,514 A * | 10/1927 | Winton | ....................... | 210/329 |
| 2,855,048 A * | 10/1958 | Jones | ....................... | 166/91.1 |
| 3,348,694 A * | 10/1967 | Smith | ....................... | 210/390 |
| 3,542,059 A * | 11/1970 | Blanchard et al. | .......... | 137/388 |
| 4,133,768 A * | 1/1979 | Theriot | ....................... | 210/452 |
| 4,550,896 A * | 11/1985 | Hansen, III | ................... | 251/84 |
| 5,853,584 A * | 12/1998 | Solbakke et al. | .......... | 210/390 |
| 5,906,733 A * | 5/1999 | Purvey | ....................... | 210/100 |
| 6,648,070 B2 * | 11/2003 | Cove et al. | ................. | 166/86.1 |
| 6,675,832 B1 * | 1/2004 | Tran et al. | ................... | 137/613 |
| 6,976,546 B2 * | 12/2005 | Herst | ............................ | 175/57 |
| 2002/0079003 A1 * | 6/2002 | Scampini | ............... | 137/625.32 |
| 2003/0098151 A1 * | 5/2003 | Cove et al. | ................. | 166/86.1 |
| 2004/0231889 A1 * | 11/2004 | Van Riet | ....................... | 175/57 |
| 2005/0269134 A1 * | 12/2005 | Strazhgorodskiy | ........... | 175/57 |

* cited by examiner

*Primary Examiner*—David Bagnell
*Assistant Examiner*—Shane Bomar
(74) *Attorney, Agent, or Firm*—Elizabeth R. Hall

(57) ABSTRACT

A strainer system having two separate strainers positioned in parallel, where one strainer can be cleaned while still permitting normal flow through the other strainer. The system flow circuit is arranged so that a high pressure backwashing flow can be applied to one strainer while the other strainer is providing its normal straining function. The backwashed strainer is then isolated by valves so that its access flange can be removed and the particulate buildup within the valve plug cleaned out. The strainer is then returned to service following the replacement of the access flange. In this manner, it is possible to alternate between the two strainers so that continuous flow can be maintained to the hydraulic choke located downstream of the strainer system.

20 Claims, 18 Drawing Sheets

FLOW SYSTEM FOR A HYDRAULIC CHOKE SOLIDS STRAINER

CROSS REFERENCE TO RELATED APPLICATIONS

This application is a divisional of U.S. patent application Ser. No. 10/880,640 filed Jun. 30, 2004 now abandoned. The disclosure of the prior application is considered part of and is incorporated by reference in the disclosure of this application. This application further claims priority to Provisional U.S. Patent Application Ser. No. 60/485,187 filed Jul. 7, 2004 by Donald Sims, et al. and entitled "Solids Strainer System for a Hydraulic Choke."

BACKGROUND OF THE INVENTION

1. Field of the Invention

The present invention relates to the drilling and production of fluids from petroleum wells. More particularly, the present invention relates to an apparatus for straining solid particulates from well fluids prior to their passage through a hydraulic choke.

2. Description of the Related Art

Hydraulic choke devices are commonly used in the oilfield when drilling or treating wells. Herein, the term "hydraulic choke" is taken to refer to the fact that the device is used with a variety of fluids, such as drilling mud, salt water, oil, gas, and other chemicals which may flow into or out from the well. "Hydraulic" does not herein refer to the choke actuation means. The hydraulic choke is utilized as a pressure-reducing valve for fluids flowing out of a well. The pressure of fluids emerging from a well flow control system must be reduced substantially in order to further process and store those fluids. A typical problem arising during operation of a hydraulic choke is a tendency for relatively large solid particulate matter to restrict or plug the choke, so that the choke's flow control becomes irregular. The particulate matter causing problems can be drill cuttings, spalled segments of the downhole geologic formations, or debris from the drilling equipment. Conventional chokes are run without any screening of the fluid or other filtering of the well fluids.

Strainer screens are routinely used to remove large particulates from the outflow stream of wells, but, except for small in-line screens, this screening is done at atmospheric pressure on vibrating screens termed shale shakers for drilling. If a significant amount of particulate matter is present or flow is sustained over a long period, then a fixed screen device will become plugged and reduce fluid flow. In such a case, the plugged screen itself can structurally fail and add to the particulate matter in the flow stream.

Hydrocyclones are also used to separate heavier components, such as rock cuttings and metallic debris, from the outflowing fluid stream. However, such particulate removal systems are used at very low system pressures. Furthermore, hydrocyclones typically will not separate particulates having relatively low specific gravities, such as rubber.

A system is needed to control the size of particles in the well fluid that passes through the piping upstream of the choke. There is also a need for a reliable means of removing particulate material from the outflow stream of a well so that strainer plugging by excessive particulate entrapment can be identified and remedied without interrupting the flow of the well. The means must be useable at very high pressures upstream of the hydraulic choke so that it can serve to protect the choke from clogging and flow damage accentuation resulting from particle entrapment in the choke.

SUMMARY OF THE INVENTION

The invention contemplates a strainer based upon a four-way, two-position rotary cylindrical plug valve having a hollow plug. The normal entry port for the sealing plug of the plug valve is a circular radial hole passing from the exterior of the plug into the interior cavity of the plug. The normal exit port for the sealing plug is a regular array of small parallel holes that fit within the diameter of the normal entry hole and with the array coaxial with the normal entry hole.

The ports for the valve body are in two pairs positioned at 90° from each other, with the axes of the ports lying in the same transverse plane as the ports of the valve plug. Each port pair consists of an entry port and a corresponding coaxial exit port. When the ports of the valve plug are aligned with the first pair of valve body ports, the flow passes into the valve plug through its normal entry port and is then strained of particulate matter by the hole array of the normal exit port as it exits the plug. When the valve plug is rotated to its other position in alignment with the second pair of valve body ports, the flow through the valve plug is reversed so that the normal exit hole array is backwashed. During such backwashing, entrapped particulates are disengaged from the hole array. When the backwashing is done, many of the particulates previously entrapped will remain within the central plug cavity, so that they can be readily removed by isolating the strainer and removing an access flange that closes the body on the open cylindrical end of the valve plug.

In order to provide a strainer system that can be cleaned while still permitting normal flow through the system, two separate strainers of the present invention are positioned in parallel. The system flow circuit is arranged so that a high pressure backwashing flow can be applied to one strainer while the other strainer is providing its normal straining function. The backwashed strainer is then isolated by valves so that its access flange can be removed and the particulate buildup within the valve plug cleaned out. The strainer is then returned to service following the replacement of the access flange. In this manner, it is possible to alternate between the two strainers so that continuous flow can be maintained to the hydraulic choke located downstream of the strainer system.

One embodiment of the present invention is a flow strainer system for use upstream of a drilling choke comprising: (a) a selectably operable first flow branch including a first flow strainer device, the first flow strainer device having (i) a first normal through flow passageway, (ii) a first reverse flow passageway, and (iii) a first valve plug containing a first entry port and a first perforated exit port, wherein the first valve plug is rotatable between a first normal and a first reverse position, wherein when the first valve plug is in the first normal position the first entry port is aligned with the first normal through flow passageway and when the first valve plug is in the first reverse position the first entry port is aligned with the first reverse flow passageway; (b) a selectably operable second flow branch including a second flow strainer device, the second flow strainer device having (i) a second normal through flow passageway, (ii) a second reverse flow passageway, and (iii) a second valve plug containing a second entry port and a second perforated exit port, wherein the second valve plug is rotatable between a second normal and a second reverse position, wherein when the second valve plug is in the second normal position the second entry port is aligned with the second normal through flow passageway and when the second valve plug is in the second reverse position the second entry port is aligned with the second reverse flow passageway; (c) a selectably operable bypass flow branch; (d) an inlet connected to the first flow branch, the second flow branch, and the bypass flow branch; and (e) an outlet connected to the first flow branch, the second flow branch, the bypass flow branch, a drilling choke, and a bifurcated backflow branch having a selectably operable fluid connection to the first reverse flow passageway and a selectably operable fluid connection to the second reverse flow passageway.

Another embodiment of the present invention includes a flow strainer system for use upstream of a drilling choke comprising: (a) a selectably operable bypass flow branch; (b) a selectably operable first flow branch including a first flow strainer device, the first flow strainer device having (i) a housing body including a central cavity, a valve stem borehole at a first end of the housing, a central axis of the housing body coaxial with the valve stem borehole and passing through the cavity and the first end of the housing body, a first and a second inlet passageway separated by an angle from each other in a plane normal to the central axis, wherein each inlet passageway intersects the central cavity, a first and a second outlet passageway separated by an angle from each other in the same plane as the first and second inlet passageways, wherein the first outlet passageway is contrapositioned from the first inlet passageway and the second outlet passageway is contrapositioned from the second inlet passageway and each outlet passageway intersects the central cavity, and a removable closure mounted on a second end of the housing body, wherein the removal of the closure provides access to the central cavity; and (ii) a valve plug positioned within the central cavity of the housing body, the valve plug being rotatable between a first and a second position, the valve plug having a plug body, a plug body central cavity having an opening at a first end of the plug body, a valve stem attached to the plug body at a second end of the plug body, wherein the valve stem traverses the valve stem hole in the housing body, an entry port passing through a first side of the plug body, wherein the entry port is aligned with the first inlet passageway whenever the valve plug is in the first position and the entry port is aligned with the second inlet passageway whenever the valve plug is in the second position, and an exit port comprising a plurality of perforations penetrating through a second side of the plug body opposed to the entry port such that the perforations are aligned with the first outlet passageway whenever the valve plug is in the first position and the perforations are rotated into alignment with the second outlet passageway whenever the valve plug is rotated to the second position; (c) a selectably operable second flow branch including a second flow strainer device, wherein the second flow strainer device is substantially similar to the first flow strainer device; (d) an inlet connected to the first flow branch, the second flow branch, and the bypass flow branch; (e) a backflow branch having a pressure charged flushing tank upstream of a selectably operable connection to the first flow strainer device and a selectably operable fluid connection to the second flow strainer device; (f) a selectably operable first fluid connection that diverts fluid from the first flow branch into the backflow branch; (g) a selectably operable second fluid connection that diverts fluid from the second flow branch into the backflow branch; and (h) an outlet connected to the first flow branch, the second flow branch, the bypass flow branch, a drilling choke, and the backflow branch.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
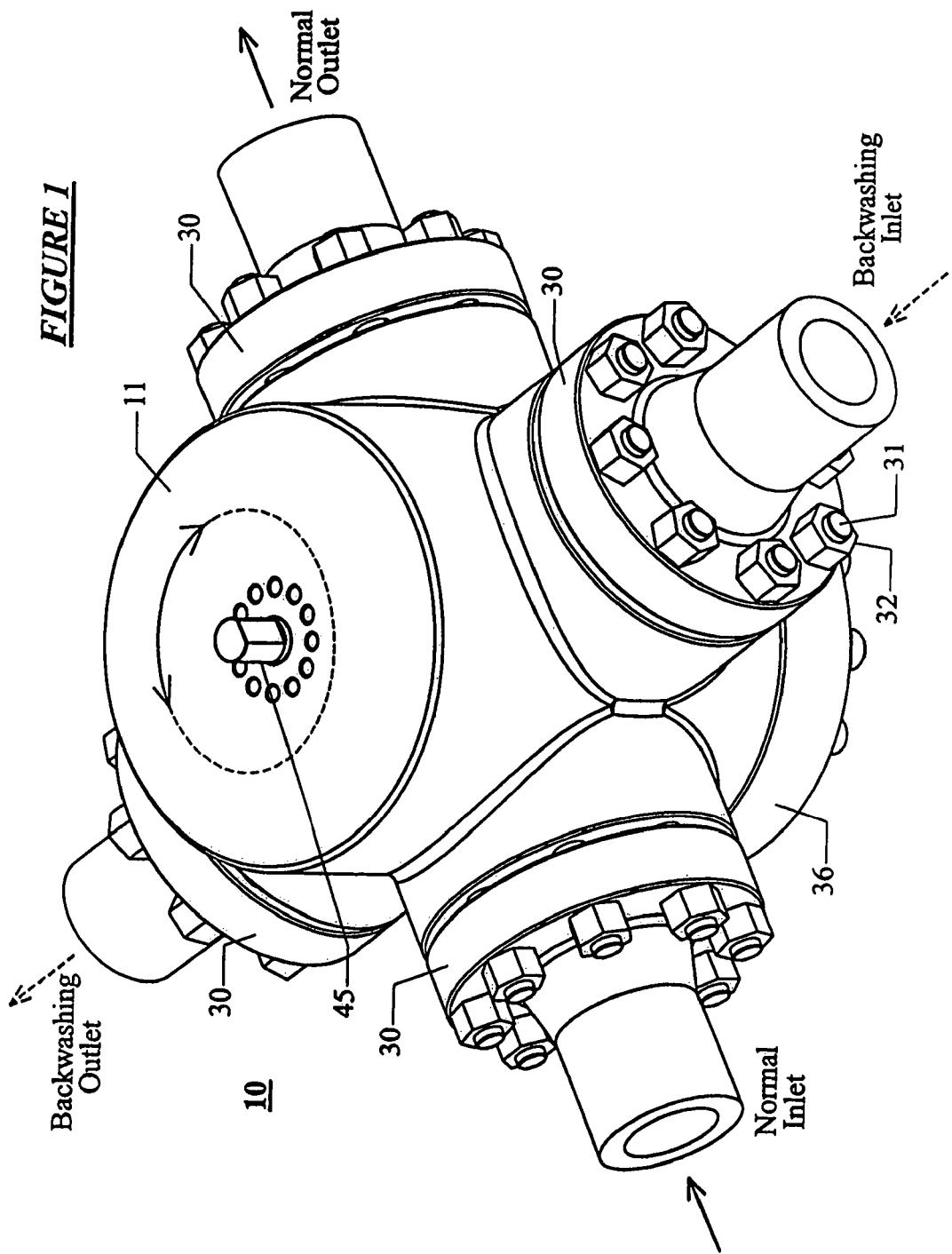
FIG. 1 is an oblique view of the strainer assembly embodiment with the connecting flanges of the flow system attached.
Figure 2:
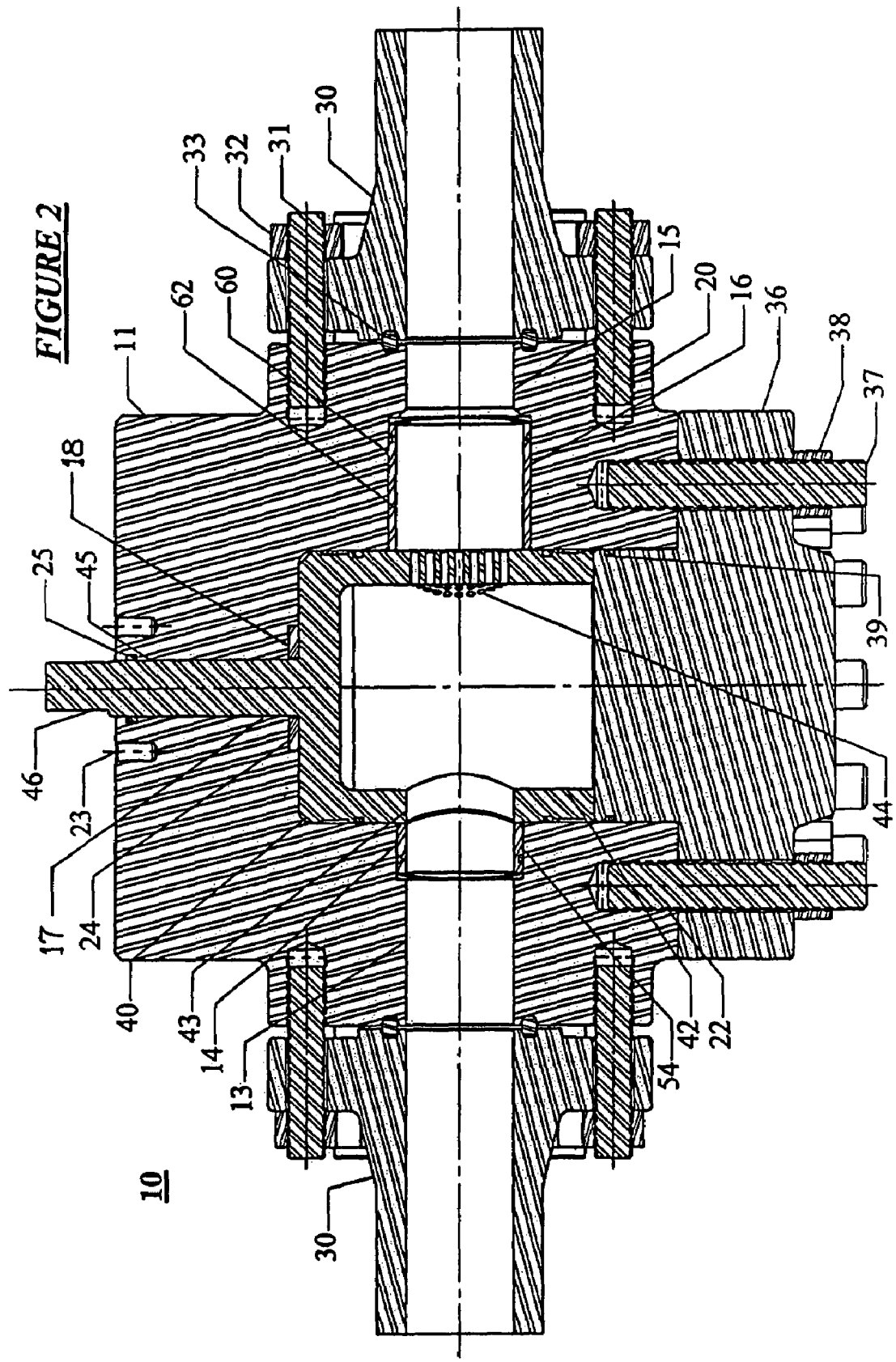
FIG. 2 is a cross-sectional view of the strainer assembly taken on the plane containing the axis of rotation of the valve plug and the coaxial normal inlet and outlet ports of the valve plug.
Figure 3:
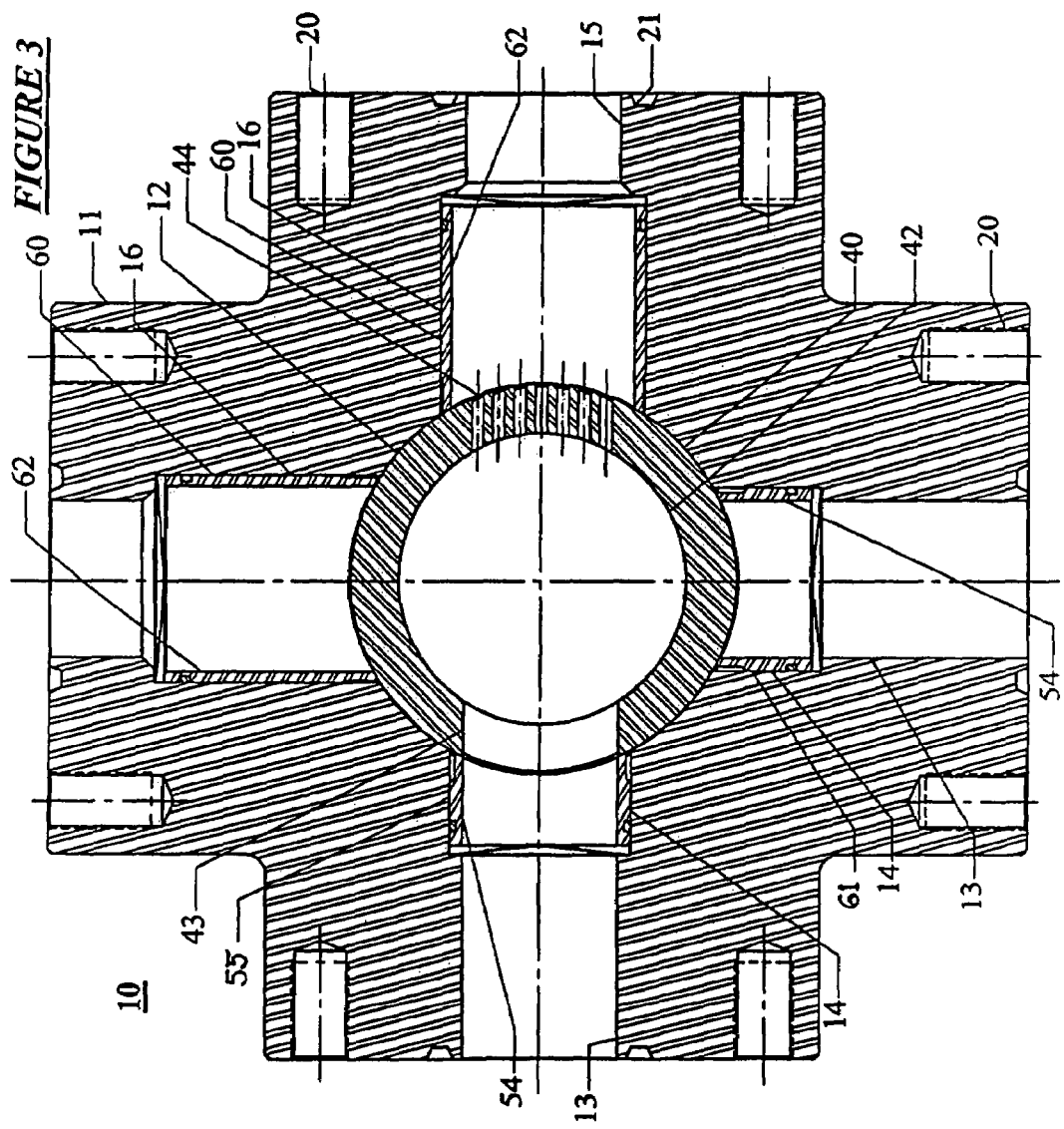
FIG. 3 is a cross-sectional view of the strainer assembly taken on the plane of the valve body port axes where the connecting flanges are not attached.

Referring to FIGS. 1 to 3, the basic strainer assembly 10 is shown in, respectively, oblique, vertical axial cross-sectional, and horizontal cross-sectional views. The major components of the strainer assembly include body 11, valve plug assembly 40, upstream and downstream seals 54 and 60 respectively, and bottom blind flange 36. The components of the strainer assembly 10 are typically made of hardened high strength low alloy steel.

Figure 11:
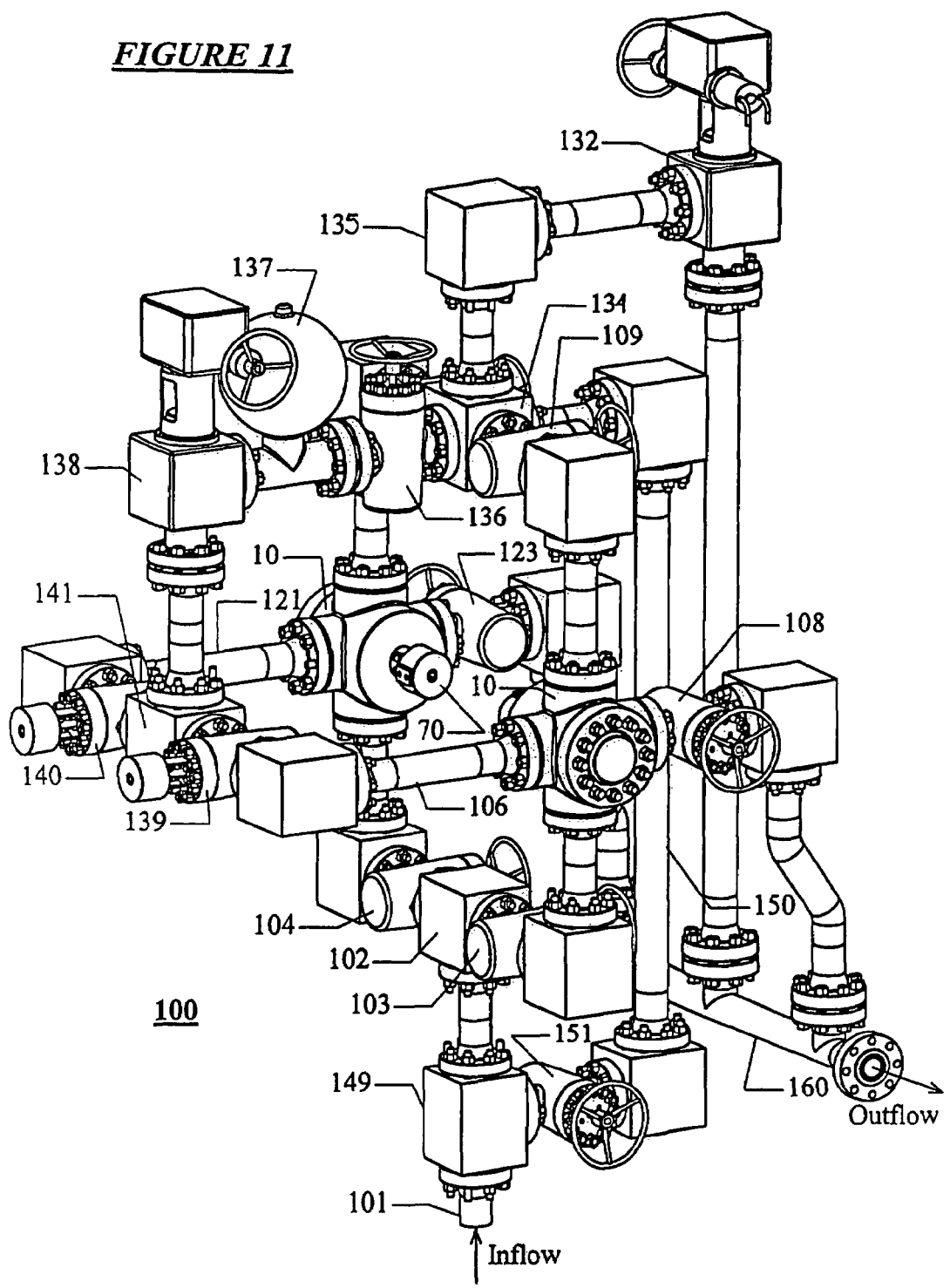
FIG. 11 is an oblique view from the upper left rear side of the strainer system configured in accordance with the circuit of FIG. 7.

The strainer basically is a two position, four way cylindrical plug valve with a modified valve plug that provides a straining function. The body 11 of strainer assembly 10 is a right circular cylindrical forging, machined component, or fabrication that has a coaxial right circular cylindrical internal valve cavity 12 and four radial branches positioned at 90° spacings. Each of the radial branches has a right circular cylindrical projected profile and an internal through bore which intersects the cavity 12. Each through flow pair of coaxial branches has an entry bore 13 on one branch and an exit bore 15 on the opposite branch, wherein typically both bores have the same diameter. The interior ends of entry bores 13 are counterbored to provide upstream seal bores 14, while the interior ends of exit bores 15 are counterbored to provide downstream seal bores 16. Stem hole 17 is a circular bore penetrating from the exterior of body 11 to the internal cavity 12 and which is coaxial with the body cylindrical axis. Multiple drilled and tapped holes 23 are provided in an array around the stem hole 17 on the upper transverse end of the body 11 so that an actuator 70 (as shown in FIG. 11) can be mounted thereon. Either a manual or a powered actuator can be utilized.

As shown in FIG. 3, the two through flow passages are positioned at 90° from each other. However, in some cases, since the outlet passages are larger than the entry passages, it may be desirable to position the entry passages farther from each other. As a consequence, the outlet passage axes are more widely separated and, hence, may be enlarged. This would be advantageous for enhancing the enhancing the resistance of the body 11 to flow erosion. It should be noted that this non-orthogonal positioning of the flow passages can also be applied to the other two embodiments 310 and 410.

Bearing cavity 18 is a shallow right circular cylindrical bore on the interior end of stem hole 17. Annular cylindrical thrust bearing 24 is positioned in bearing cavity 17 into which it closely fits. The thickness of bearing 24 is such that it projects inwardly into the valve cavity 12 beyond the transverse interior end of the cavity. As shown here, an annular disk of polymeric material, such as glass-filled polytetrafluroethylene (PTFE or Teflon™) is used, but a sealed rolling element thrust could be substituted if the high pressures caused rotational friction to be excessive. The exterior end of stem hole 17 has a female O-ring groove in which O-ring 25 is mounted to provide sealing between the valve stem 45 and the stem hole 17. Optionally, a valve stem packing assembly or cartridge such as used in a commercial gate valve or ball valve can be fitted to the upper end of the stem hole 17.

The exterior transverse end of each of the radial branches of body 11 is provided with a seal ring groove 21 and a bolt hole circle consisting of drilled and tapped holes 20, where the seal ring groove and the bolt hole circle are concentric with the entry or exit bore of that branch. The seal ring groove 21 is configured to hold a deformable annealed stainless steel high pressure sealing ring 33 of the American Petroleum Institute type BX, RX, or R configuration, as determined by the design pressure capabilities of the equipment. The size of the sealing ring 33 is consistent with the size of the entry 13 or exit bore 15 and the required pressure rating of the strainer 10. The bolt hole circle 20 has a hole and thread size and circle diameter consistent with the sealing ring and required pressure rating of the strainer body 11. A flow flange 30 is mounted onto each of the four radial branches of body 11 for interconnection of the strainer assembly 10 to its support flow system. Each flow flange 30 is welded to a section of high pressure piping, but only pipe stubs are shown attached to the flanges in FIGS. 1 and 2 for illustration. A sealing ring 33 and an array of studs 31 engaged in holes 20 are used with nuts 32 for rigidly and sealingly attaching each flange 30 to the body 11.

The bottom transverse end of body 11 is provided with a regular array of drilled and tapped holes 22 to provide a bolt hole circle for the mounting of the bottom blind flange 36 which serves to close the cavity 12 of the body 11 of the strainer assembly 10. Each of the tapped holes 22 is provided with a threaded stud 37 that mounts a hex nut 38 for retaining the bottom flange 36.

The bottom flange 36 is of right circular cylindrical construction with a reduced diameter concentric right circular cylindrical interior projection comateable with the interior bore of cavity 12 of body 11 and having an external central thickened section on its exterior side. Flange 36 has a male O-ring groove mounting O-ring 39 on its upper interior end so that sealing is provided between the interior projection of bottom flange 36 and the cavity 12 of the body 11. Alternatively, the connection of the bottom flange 36 to the body 11 also may be sealed with a metal sealing ring. The flange portion of bottom flange 36 has a regular array of bolt holes in a circular pattern so that the studs 37 and nuts 38 can be used to mount the bottom flange to the body 11 of strainer assembly 10.

Figure 4:
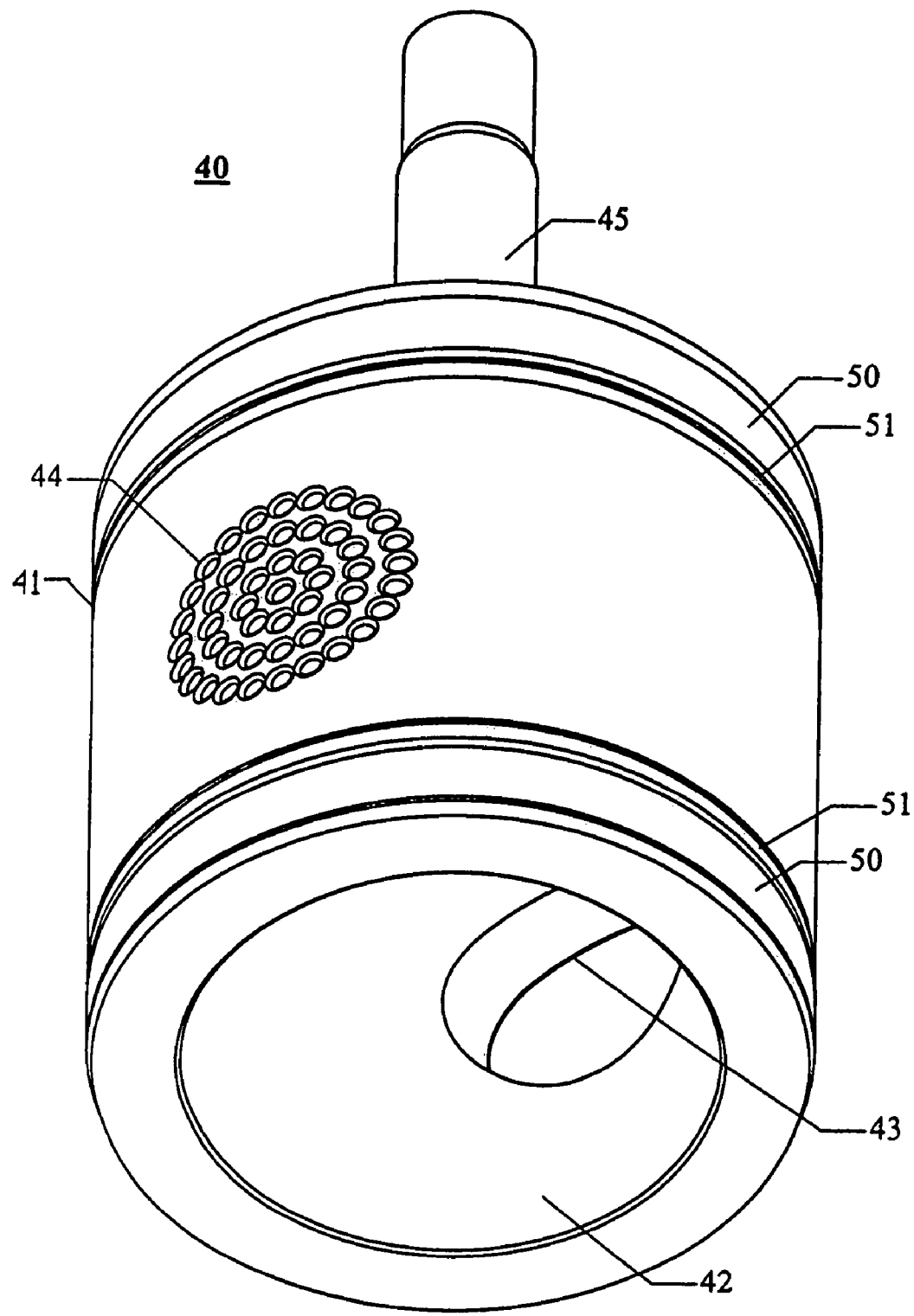
FIG. 4 is an oblique view of the valve plug from the side and open end of the valve plug.
Figure 5:
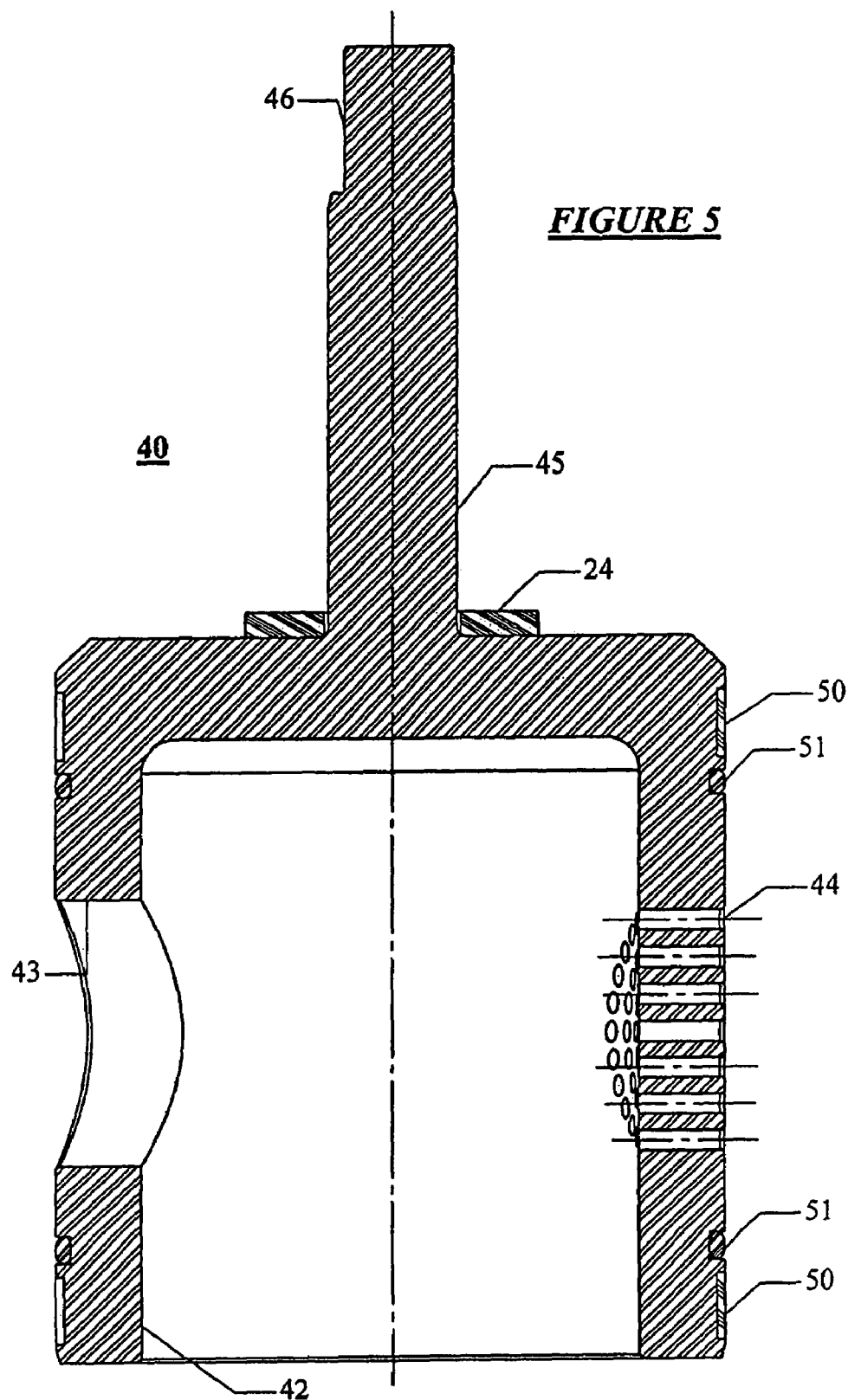
FIG. 5 is a cross-sectional view of the valve plug assembly taken on the plane containing the axis of rotation of the valve plug and its normal entry and exit ports.

The valving action and straining function of the strainer assembly 10 is provided by valve plug assembly 40, which is shown in more detail in FIGS. 4 and 5. The valve plug body 41 of the valve plug assembly 40 is a right circular cylinder with a concentric right circular cylindrical bore interior cavity 42 on its lower end and a concentric cylindrical valve stem 45 projecting upwardly on its upper end. The wall thickness of the valve plug body 41 is chosen to resist high external or internal pressures when it is sealing. The exterior surface of the valve plug body 41 is polished so that it is compatible with metal-to-metal sealing.

A radially positioned cylindrical valve cavity entry port 43 intersects the axis of valve plug body 41 at approximately midheight. Concentric with entry port 43 but on the opposed side of the valve plug body 41, a regular array of valve cavity exit holes 44 is provided. Typically the valve cavity exit holes 44 would have equal diameters of approximately 0.125 to 0.500 inch. In the example shown in FIG. 4, the exit holes 44 are parallel and regularly positioned in a pattern of regularly spaced multiple concentric rings around the projected axis of valve plug entry hole 43. It is readily understood that other hole array patterns may be selected, the sizes of individual holes in the array can be different, and that the holes may be positioned radially, rather than mutually parallel to the desired exit axis.

The cross-sectional flow area of the aggregate of the exit holes 44 is less than the flow area of entry hole 43, but the exit flow area is chosen to not be excessively restrictive. The upper end of the valve stem 45 is slightly reduced and provided with a flat readily engageable by a conventional 90° valve actuator. The upper and lower external cylindrical surfaces of the main portion of valve plug body 41 are each provided with an annular male O-ring groove mounting an O-ring 51 and an annular rectangular cross-sectional groove for the mounting of a thin strip of plastic bearing material.

A valve plug bearing 50 consisting of a thin strip of glass-reinforced PTFE is mounted in each bearing groove and projects slightly beyond the outer diameter of the valve plug body 41 so that they can serve as rotary bearings for the valve plug assembly 40. The plug O-rings 51 serve both as seals and as dirt excluders for the exterior of the valve plug body 41. However, it may be necessary to cut the upper O-ring 51 in order to avoid a pressure lock when assembling the strainer 10.

Figure 6A:
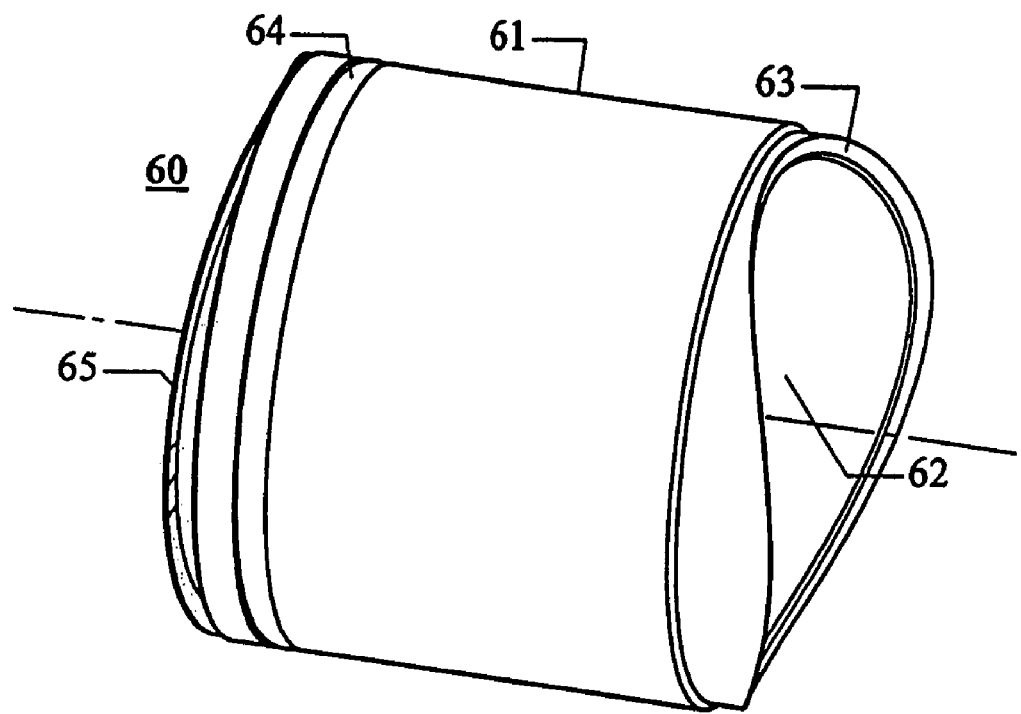
FIG. 6A is an oblique view of an outlet valve seat assembly of the strainer assembly.
Figure 6B:
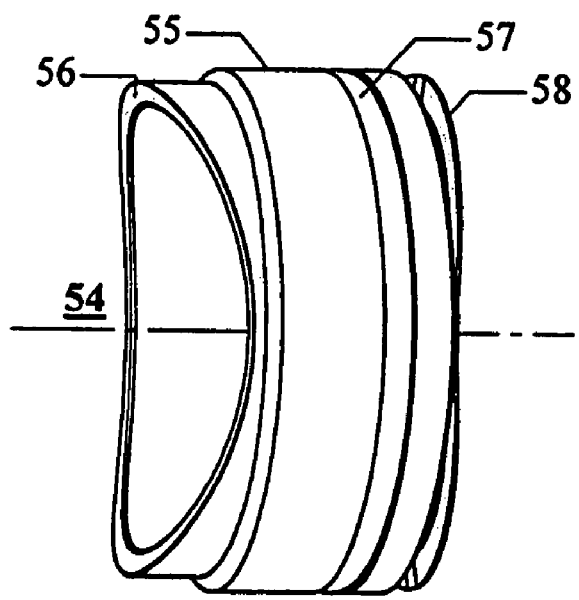
FIG. 6B is an oblique view of an inlet valve seat assembly of the strainer assembly.

FIGS. 6A and 6B show the details of the upstream 54 and downstream 60 seal assemblies. Upstream seal assembly 54 consists of body 55, O-ring 57, and wave spring 58. Upstream seal assembly 54 has a thin walled right circular tube body 55 that has an externally reduced diameter on its inner end and an external male O-ring groove mounting O-ring 57 on its outer end. The inner end of the upstream seal body 55 has a cylindrical surface 56 which has an axis intersecting but normal to the cylindrical axis of the main portion of body 55. The sealing face 56 is lapped to the exterior of the body of valve plug body 41 so that it can serve to provide metal-to-metal sealing therewith. The upstream seal body 55 closely fits in an upstream seal bore 14 of the body of strainer assembly 10, and its O-ring 57 seals between the seal body 55 and the strainer body 11. Each of the two upstream seal bores 14 receives an upstream seal assembly 54. A wave spring 58 is positioned between the shoulder of the outer transverse end of the upstream seal bore 14 and the outer end of the upstream seal body 55 so that the upstream seal assembly 54 is urged into sealing contact with the valve plug body 41 of the valve plug assembly 40.

Downstream seal assembly 60 consists of body 61, O-ring 64, and wave spring 65. Downstream seal assembly 60 has a thin walled right circular tube body 61 that has an externally reduced diameter on its inner end and an external male O-ring groove mounting O-ring 64 on its outer end. The outer diameter of the downstream seal body 61 is larger than that of the corresponding diameter on the upstream seal body 55, and the downstream seal body 61 is also comparatively longer. The interior bore 62 of the downstream seal body 61 is larger than the exit bore 15 and is typically hard-faced in order to resist the erosive action of flow turbulence. The inner end of the downstream seal body 61 has a cylindrical surface 63 which has an axis intersecting but normal to the cylindrical axis of the main portion of body 61. The sealing face 63 is lapped to the exterior of the body of valve plug body 41 so that it can serve to provide metal-to-metal sealing therewith. The downstream seal body 61 closely fits in a downstream seal bore 16 of the body of strainer assembly 10, and its O-ring 64 seals between the seal body 61 and the strainer body 11. Each of the two downstream seal bores 16 receives a downstream seal assembly 60. A wave spring 65 is positioned between the shoulder of the outer transverse end of the downstream seal bore 16 and the outer end of the downstream seal body 61 so that the downstream seal assembly 60 is urged into sealing contact with the valve plug body 41 of the valve plug assembly 40.

Figure 7:
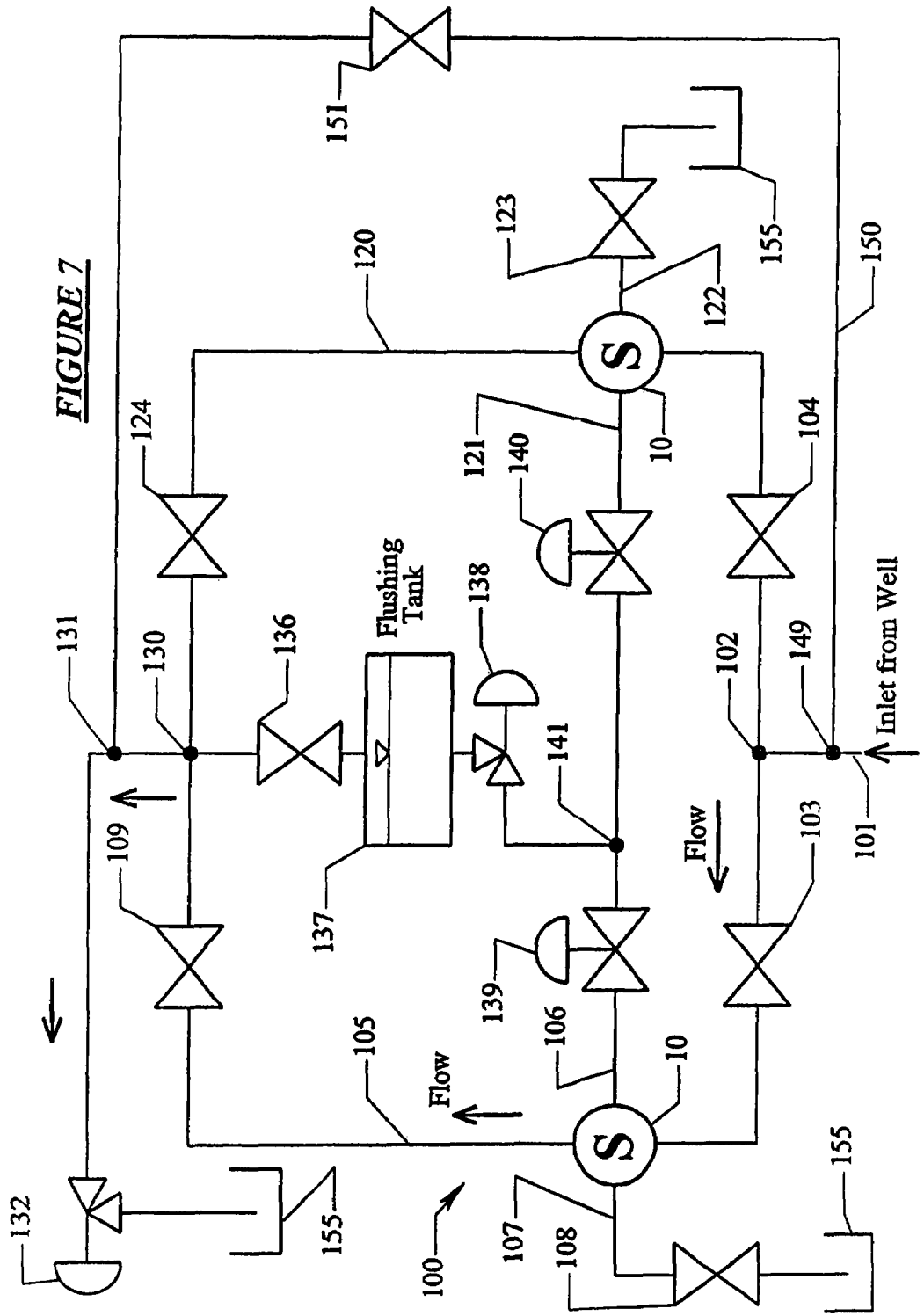
FIG. 7 is a schematic diagram of the flow circuit used for the strainer system showing the system configured to flow normally through the first strainer assembly.

FIGS. 7 to 10 schematically show the hydraulic flow circuitry used to support a dual strainer system, wherein one strainer can be serviced while the other strainer continues in active service. Referring to FIG. 7, the strainer system 100 utilizes lefthand and righthand strainer assemblies 10. Flow enters the strainer system 100 from the well (not shown) through inlet 101. Immediately downstream from inlet 101, inlet branching tee 149 is connected so that flow can be diverted around the main, normally used flow system into bypass line 150. Flow through bypass line 150 is controlled on or off by manual gate valve 151. The bypass flow around the main system is rejoined to the flow path to the main hydraulic choke 132 by interconnection at outflow branch tee fitting 131.

Non-bypassed flow which enters the main flow path of the strainer system 100 at tee 149 passes to branching tee 102, which connects to both the lefthand and the righthand strainer flow paths. On the lefthand flow path, manual gate valve 103 provides on/off control for flow entering the lefthand separator assembly 10. Normally, when lefthand separator 10 is actively functioning as a separator, flow enters into the separator through an upstream entry bore 14 and exits through its coaxial downstream exit bore 16, where it passes into lefthand strainer normal outlet line 105. Lefthand strainer backwashing inlet 106 is connected to the other downstream exit bore 16 of the lefthand strainer assembly 10, and lefthand strainer backwashing outlet 107 is connected to the other upstream entry bore 14 of the lefthand assembly 10. Flow from lefthand strainer backwashing outlet 107, controlled on/off by manual gate valve 108, is passed to storage tank or reservoir 155. The normal outflow from the lefthand strainer assembly 10 passes from lefthand strainer normal outlet line 105 to on/off lefthand strainer normal outlet line manual gate valve 109 and then to flow cross fitting 130.

On the righthand flow path, manual gate valve 104 provides on/off control for flow entering the righthand separator assembly 10. Normally, when righthand separator 10 is actively functioning as a separator, flow enters into the separator through an upstream entry bore 14 and exits through its coaxial downstream exit bore 16, where it passes into righthand strainer normal outlet line 120. Righthand strainer backwashing inlet 121 is connected to the other downstream exit bore 16 of the righthand strainer assembly 10, and righthand strainer backwashing outlet 122 is connected to the other upstream entry bore 14 of the righthand assembly 10. Flow from righthand strainer backwashing outlet 122, controlled on/off by manual gate valve 123, is passed to storage tank or reservoir 155. The normal outflow from the righthand strainer assembly 10 passes from righthand strainer normal outlet line 120 to on/off righthand strainer normal outlet line manual gate valve 124 and then to flow cross fitting 130.

Flow entering the flow cross 130 normally comes only from the lefthand or the righthand strainer assembly 10, rather than from both assemblies 10. However, when switching from one side of the flow circuit to the other, it may be desirable to simultaneously modulate the flow from the lefthand and righthand strainer assemblies 10 so that the flowrate from the well is maintained at a constant value and the producing geological formation thereby is not subjected to variations in pressure. This modulation of flows during changeover from one side of the system to the other can be accomplished by monitoring the system inlet pressure at tee 149 and letting the actuator of the closing strainer assembly 10 be slaved by a control system (not shown) to the opening strainer assembly such that the inlet flow is not significantly perturbed. Typically, such an operation can be performed with restrictions applied to the rotation of the actuators when they are moving the valve plug assembly 40 of the strainer assembly 10 from its backwashing position to its normally flowing straining position. In the event that the well flow is relatively insensitive to flow perturbations, then the strainers could have their valve stems directly coupled, but out of phase, and a single actuator used to simultaneously operate the valve plug assembly 40 rotation for both valves.

Normally, flow exiting from the strainers comes only from one side at a time and is then directed totally from the cross fitting 130 to the main choke 132 by way of tee fitting 131 and thence to the tank 155. However, when it is desired to backwash one of the strainers 10, then a portion of the outflow from the other strainer is diverted. At such a time, while non-bypassed flow is passing the system, normally closed manual gate valve 136 can be opened to admit fluid to the flushing system branch of the circuit. The flushing system has flushing tank or reservoir immediately downstream of gate valve 136, with flushing hydraulic choke 138 downstream of the tank 137. The outflow from flushing choke 138 enters flushing system branch tee fitting 141, where one exit path goes to lefthand actuated gate valve 139 and the other exit path goes to righthand actuated gate valve 140. The outflows from, respectively, gate valves 139 and 140 are connected to lefthand strainer backwashing inlet 106 and righthand strainer backwashing inlet 121.

Figure 12:
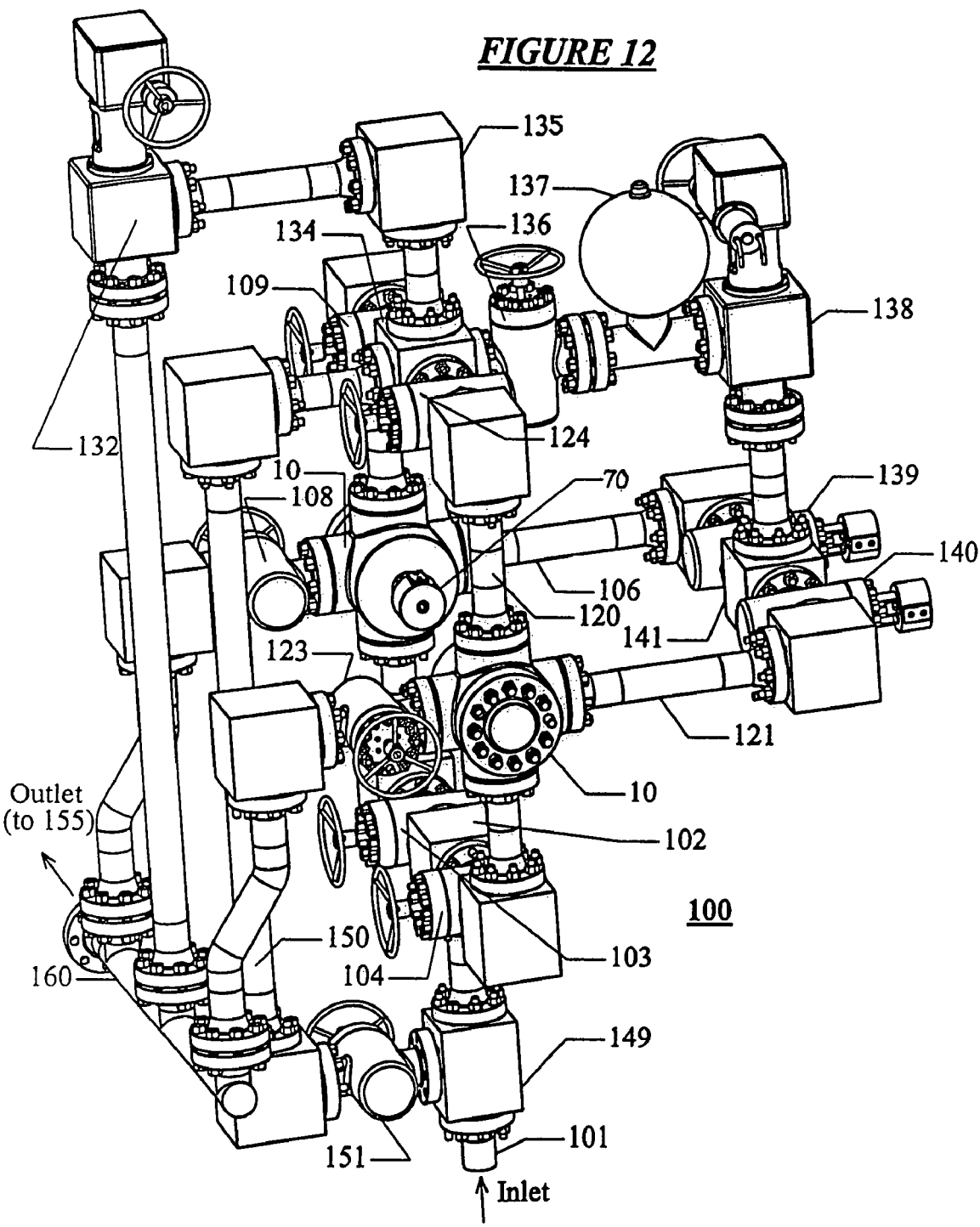
FIG. 12 is an oblique view from the upper right front side of the strainer system configured in accordance with the circuit of FIG. 7.

One possible physical arrangement of the flow circuitry for the dual strainer system 100, which is shown in FIGS. 7 to 10, is shown in the two oblique views of FIGS. 11 and 12. For the flow circuitry of strainer system 100, shown in FIGS. 11 and 12, the combination of cross fitting 130 and branch fitting 131 are replaced by the equivalent pair of five way fitting 134 and elbow 135. In this case, branch line 150 ties into fitting 134, along with the strainer normal outlet lines 105 and 120, the flush line to valve 136, and the outflow line to choke 132. The outlet flow from fitting 134 is passed though elbow 135. In this arrangement, the outlet flows to the tank 155 from the lines 107, 122, and from the main choke 132 are passed into common outlet header 160. Other physical arrangements are feasible, but the example shown in FIGS. 11 and 12 is included by way of illustration.

Figure 13:
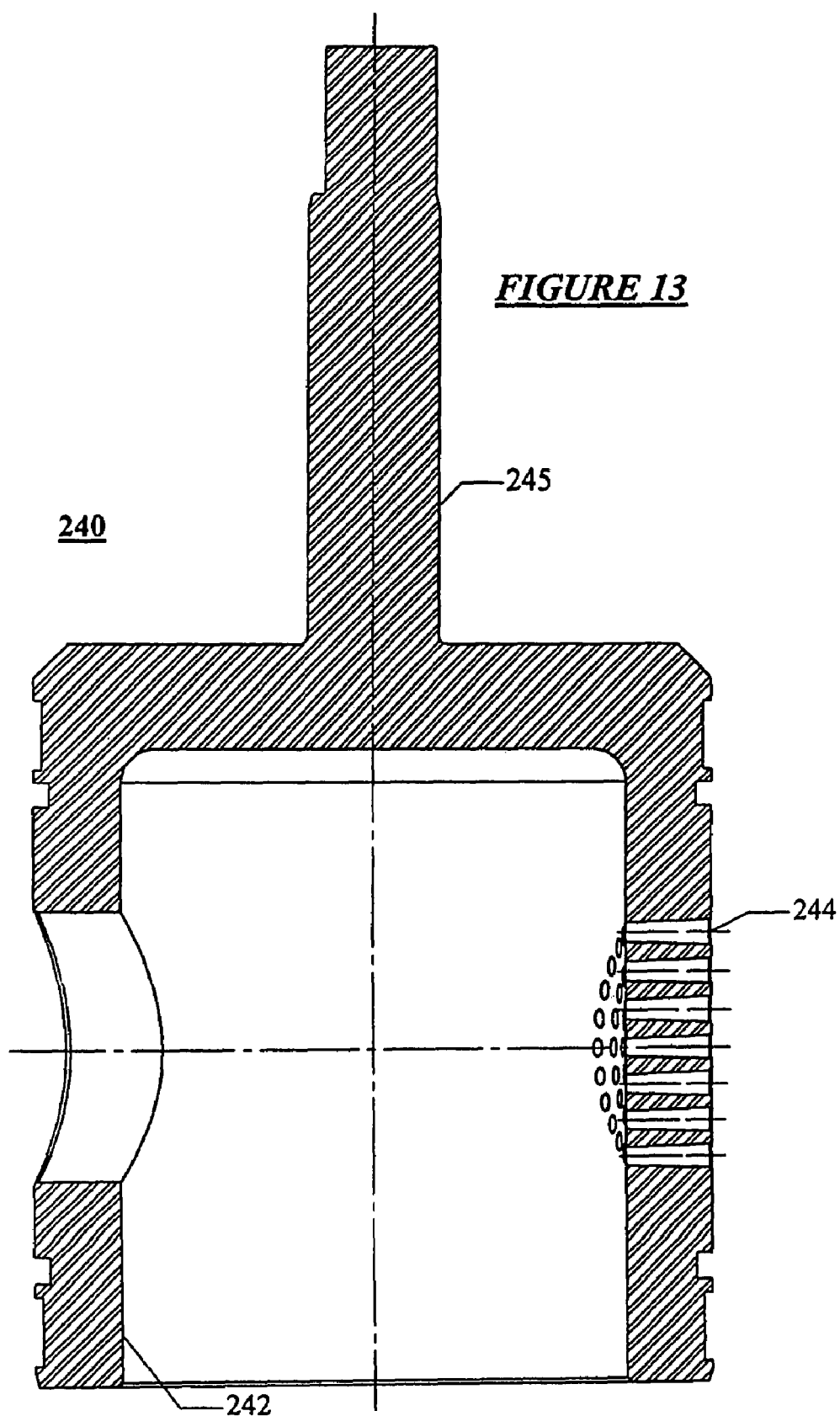
FIG. 13 is a cross-sectional view of a first alternative valve plug taken on the plane containing the axis of rotation of the valve plug and its normal entry and exit ports, wherein the strainer holes are tapered outwardly in the exit direction.

An alternative valve plug assembly 240 arrangement, shown in FIG. 13, to the constant cross-section strainer hole array 44 of valve plug assembly 40 that is shown in FIG. 5, provides a strainer that is less likely to clog. The valve plug assembly 240 of FIG. 13 is identical to that of valve plug assembly 40 except that the holes of the strainer exit hole array 244 are outwardly tapered, so that particulate matter is unlikely to entrapped intermediate to the length of the hole. This tapering of the holes eases the cleaning of the strainer holes 244 during backflowing.

Figure 14:
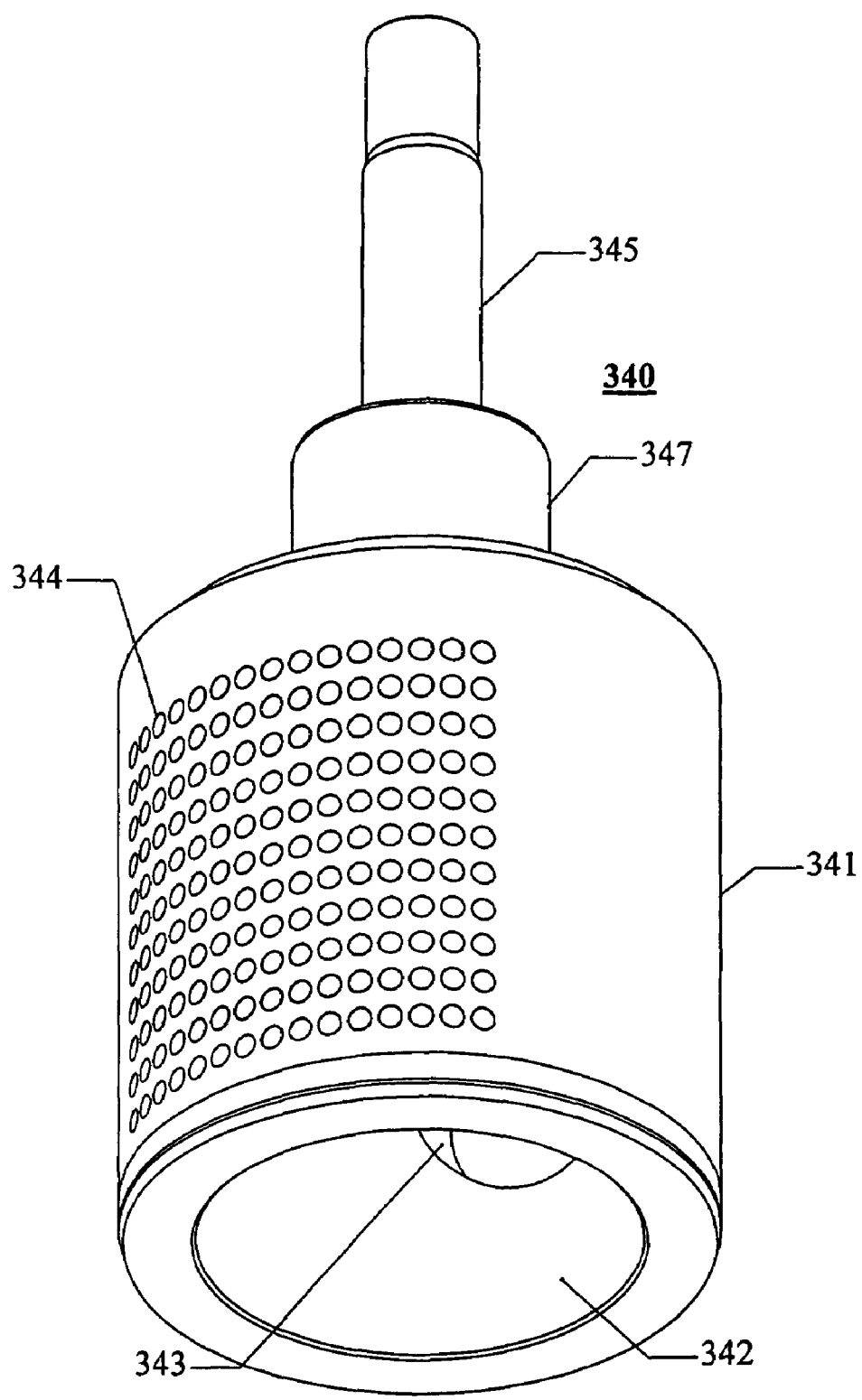
FIG. 14 is an oblique view of a second alternative valve plug from its lower side and outlet end, wherein the strainer holes are radial and positioned in a regular arcuate pattern of constant axial height.
Figure 15:
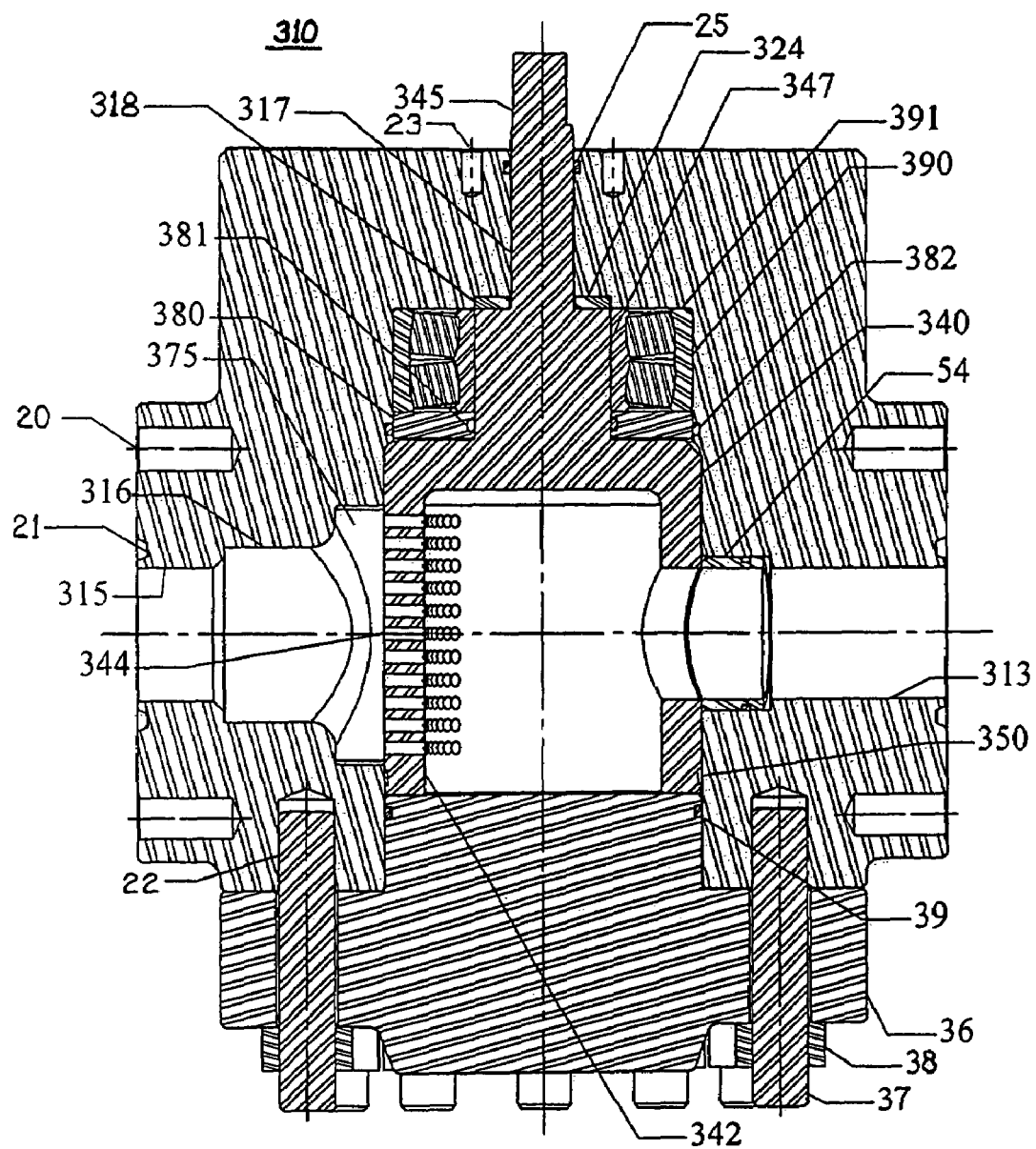
FIG. 15 is a cross-sectional view of a first alternative strainer assembly taken on the plane containing the axis of rotation of the valve plug and the coaxial normal inlet and outlet ports of the valve plug, wherein the body of this alternative strainer is configured to work with the second alternative valve plug of FIG. 14.

FIG. 14 shows a second alternative type of valve plug 340 configured to be used with a different type of strainer 310 or 410. The valving action and straining function of the strainer assembly 310 or 410 is provided by valve plug assembly 340, as shown in more detail in FIGS. 15 and 16 for strainer 310 and in FIGS. 17 and 18 for strainer 410. The valve plug body 341 of the valve plug assembly 340 is a right circular cylinder with a concentric right circular cylindrical bore interior cavity 342 on its lower end and a concentric cylindrical valve stem 345 projecting upwardly on its upper end. The lower end of valve stem 345 has an enlarged right circular cylindrical section 347 which serves as a bearing mount for roller bearing 390, as seen in FIGS. 15 and 17. The wall thickness of the valve plug body 341 is chosen to resist high external or internal pressures when it is sealing. The exterior surface of the valve plug body 341 is polished so that it is compatible with metal-to-metal sealing.

A radially positioned cylindrical valve cavity entry port 343 intersects the axis of valve plug body 341 at approximately midheight. Concentric with entry port 343 but on the opposed side of the valve plug body 341, a regular array of valve cavity exit holes 344 is provided. As shown, the radial valve cavity exit holes 344 are all of the same diameter of approximately 0.125 to 0.500 inch and regularly positioned in a pattern of regularly angularly spaced multiple rows parallel to the longitudinal axis of body 341 around the projected axis of valve plug entry hole 343. It is readily understood that many other hole array patterns may be selected and the sizes of individual holes in the array can be different. The cross-sectional flow area of the aggregate of the exit holes 344 is more than the flow area of entry hole 343 so that the exit flow area is chosen to not be excessively restrictive, even when a large amount of plugging of the holes occurs.

The lower external cylindrical surfaces of the main portion of valve plug body 341 is provided with an annular rectangular cross-sectional groove for the mounting of a thin strip of plastic bearing material. A valve plug bearing 350 consisting of a thin strip of glass-reinforced PTFE is mounted in the bearing groove and projects slightly beyond the outer diameter of the valve plug body 341 so that it can serve as a rotary bearing for the valve plug assembly 340.

Figure 16:
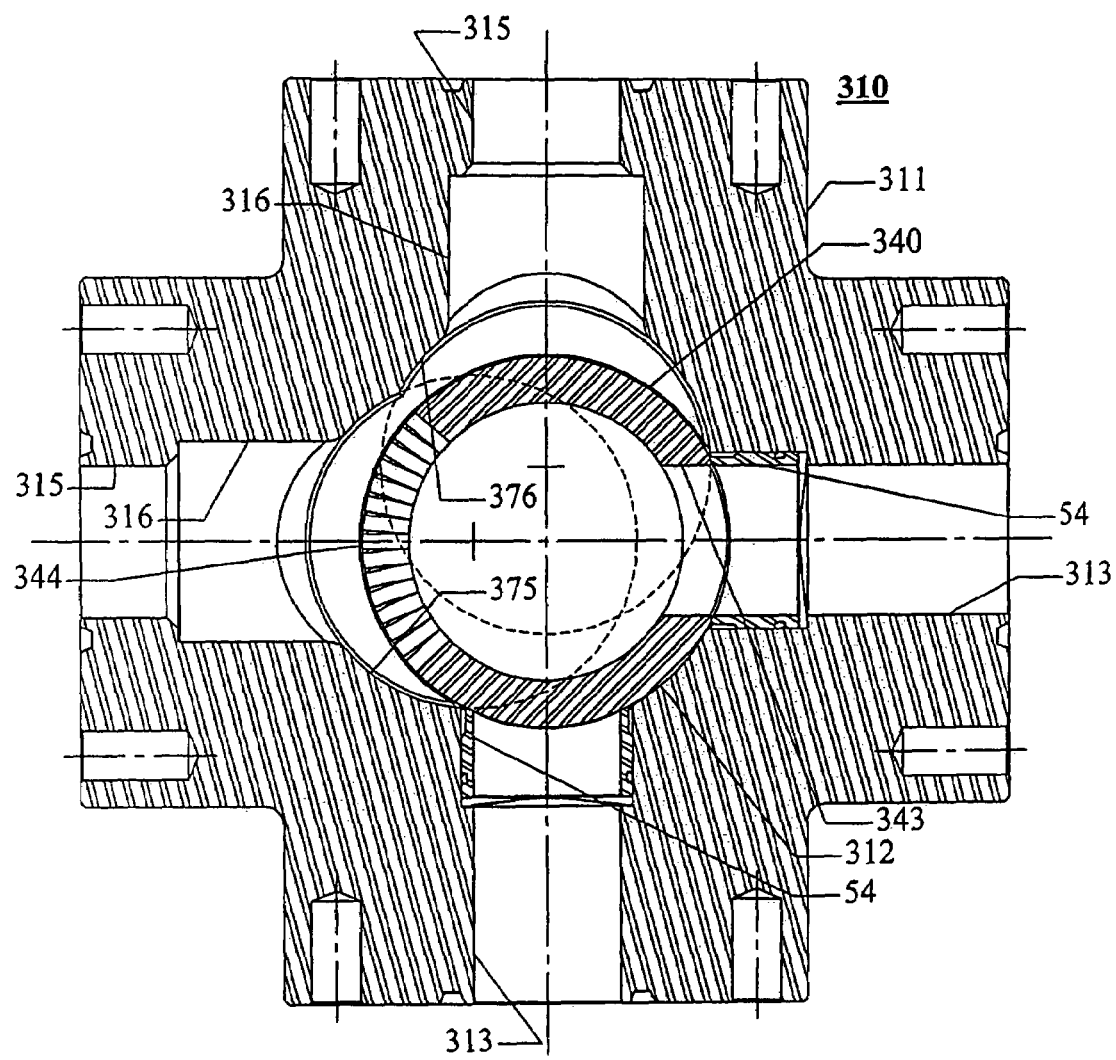
FIG. 16 is a cross-sectional view of the strainer assembly of FIG. 15 taken on the plane of the valve body port axes where the valve plug ports are aligned with the first valve body port pair and the connecting flanges are not attached.
Figure 17:
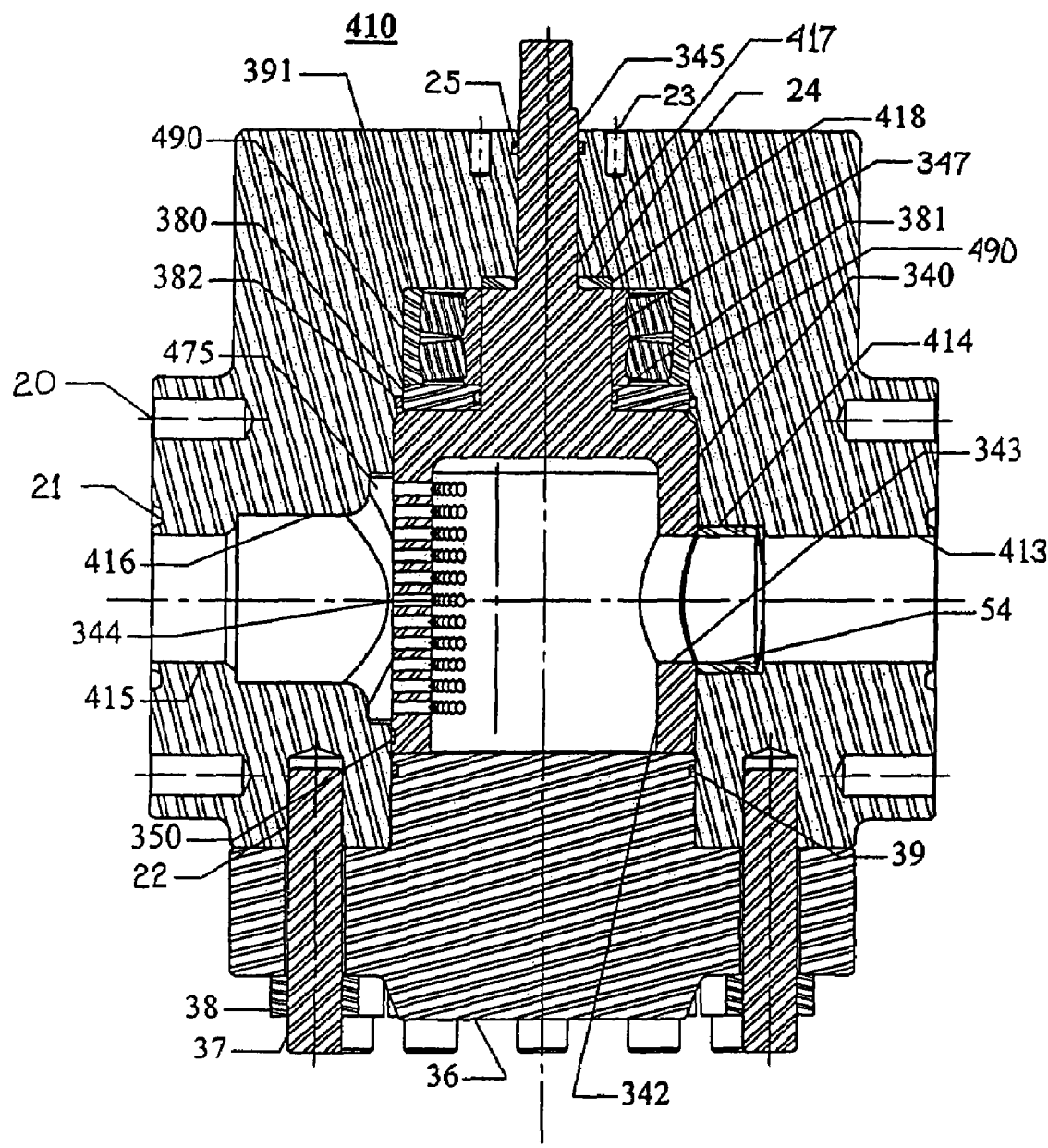
FIG. 17 is a cross-sectional view of a second alternative strainer assembly taken on the plane containing the axis of rotation of the valve plug and the coaxial normal inlet and outlet ports of the valve plug, wherein the body of this alternative strainer is also configured to work with the second alternative valve plug of FIG. 14.

Referring to FIGS. 15 and 16, the alternative strainer assembly 310 is shown in, respectively, vertical axial cross-sectional and horizontal cross-sectional views. The major components of the strainer assembly include body 311, valve plug assembly 340, upstream seals 54, and bottom blind flange 36. The components of the strainer assembly 310 are typically hardened high strength low alloy steel.

The strainer 310 basically is a two position, four way cylindrical plug valve with a modified valve plug that provides a straining function. This version of the strainer 310 uses several of the same components as does the strainer 10 and can be used interchangeably with strainer 10. The same component numbers are used to identify identical components in the different versions of the strainer.

The body 311 of strainer assembly 310 is a right circular cylindrical forging, machined component, or fabrication which has a coaxial right circular cylindrical internal valve cavity 312 and four radial branches positioned at 90° spacings. Two right circular cylindrical subbores 375 and 376 intersect body cavity 312. Each of the subbores 375 and 376 has the same diameter and a height somewhat in excess of the height (parallel to the longitudinal axis of plug 340) of the hole array 344. Each of the subbores is centered on the axis of an exit bore 315 and both are equally offset from the axis of body cavity 312. The purpose of the subbores is to provide a flow path for the hole array 344 of the valve plug 340 when the valve plug is aligned with either of the flow passages 315.

The faces of the subbores 375, 376 are stood off from the outer surface of valve plug 340 sufficiently that body erosion is minimized. Each of the radial branches has a right circular cylindrical projected profile and an internal through bore which intersects the cavities 312 and/or subbores 375 and 376. Each pair of coaxial branches has an entry bore 313 on one branch and an exit bore 315 on the opposite branch. Typically the entry bore 313 and exit bore 315 will have the same diameter. The interior ends of entry bores 313 are counterbored to provide upstream seal bores, while the interior ends of exit bores 315 are counterbored to provide flow convergence chambers 316.

Stem hole 317 is a circular bore penetrating from the exterior of body 311 to the internal cavity 312 and which is coaxial with the body cylindrical axis. Multiple drilled and tapped holes 23 are provided in an array around the stem hole 317 on the upper transverse end of the body 311 so that an actuator 70 (as shown in FIG. 11) can be mounted thereon. Either a manual or a powered actuator can be utilized.

Thrust bearing cavity 318 is a shallow right circular cylindrical bore on the interior end of stem hole 317 providing clearance for the bearing mount 347 of valve plug 340. Between the bearing cavity 318 and the body cavity 312 is located right circular cylindrical roller bearing cavity 390, which has a female O-ring groove mounting O-ring 382 adjacent the body cavity 312. Annular cylindrical thrust bearing 324 is positioned in bearing cavity 318 into which it closely fits. The thickness of bearing 324 is such that it projects inwardly into the valve cavity 312 beyond the transverse interior end of the cavity. As shown here, an annular disk of polymeric material, such as glass-filled polytetrafluro-ethylene (PTFE or Teflon™) is used, but a sealed rolling element thrust could be substituted if the high pressures caused rotational friction to be excessive.

A large capacity spherical roller bearing 391 is mounted in bearing cavity 390 so that it provides rotational support for the valve plug 340. The space between the bearing and the valve plug is filled with annular cylindrical disk 380, which has a female O-ring groove mounting O-ring 381 in its interior bore. O-ring 381 typically is cut. Disk 380, together with O-rings 381 and 382, provides a dirt exclusion function so that bearing 391 is not contaminated during operation. The exterior end of stem hole 317 has a female O-ring groove in which O-ring 25 is mounted to provide sealing between the valve stem 345 and the stem hole 317. Optionally, a valve stem packing assembly or cartridge such as used in a commercial gate valve or ball valve can be fitted to the upper end of the stem hole 317.

The exterior transverse end of each of the radial branches of body 311 is provided with a seal ring groove 21 and a bolt hole circle consisting of drilled and tapped holes 20 identical to those of strainer 10, where the seal ring groove and the bolt hole circle are concentric with the entry or exit bore of that branch. The seal ring groove 21 is configured to hole a deformable annealed stainless steel high pressure sealing ring 33 of the American Petroleum Institute type BX, RX, or R configuration, as determined by the design pressure capabilities of the equipment. The size of the sealing ring 33 is consistent with the size of the entry 313 or exit bore 315 and the required pressure rating of the strainer 310. The bolt hole circle 20 has a hole and thread size and circle diameter consistent with the sealing ring and required pressure rating of the strainer body 11. A flow flange 30 may be mounted onto each of the four radial branches of body 311 for interconnection of the strainer assembly 310 to its support flow system, as in the case of strainer 10, but for clarity no flanges 30 are shown in FIGS. 15 and 16. A sealing ring 33 and an array of studs 31 engaged in holes 20 may be used with nuts 32 to rigidly and sealingly attach each flange 30 to the body 11.

The bottom transverse end of body 311 is provided with a regular array of drilled and tapped holes 22 to provide a bolt hole circle for the mounting of the bottom blind flange 36 which serves to close the cavity 312 of the body 311 of the strainer assembly 310. Each of the tapped holes 22 is provided with a threaded stud 37 that mounts a hex nut 38 for retaining the bottom flange 36. The upper transverse end of the body 311 is also provided with an array of drilled and tapped mounting holes 23 concentric with the axis of body 311 so that an actuator can be mounted on the strainer assembly 310.

As before, the bottom flange 36 is of right circular cylindrical construction with a reduced diameter concentric right circular cylindrical interior projection comateable with the interior bore of cavity 312 of body 311 and having an external central thickened section on its exterior side. Flange 36 has a male O-ring groove mounting O-ring 39 on its upper interior end so that sealing is provided between the interior projection of bottom flange 36 and the cavity 312 of the body 311. Alternatively, the connection of the bottom flange 36 to the body 311 also may be sealed with a metal sealing ring. The flange portion of bottom flange 36 has a regular array of bolt holes in a circular pattern so that the studs 37 and nuts 38 can be used to mount the bottom flange to the body 311 of strainer assembly 310.

Figure 18:
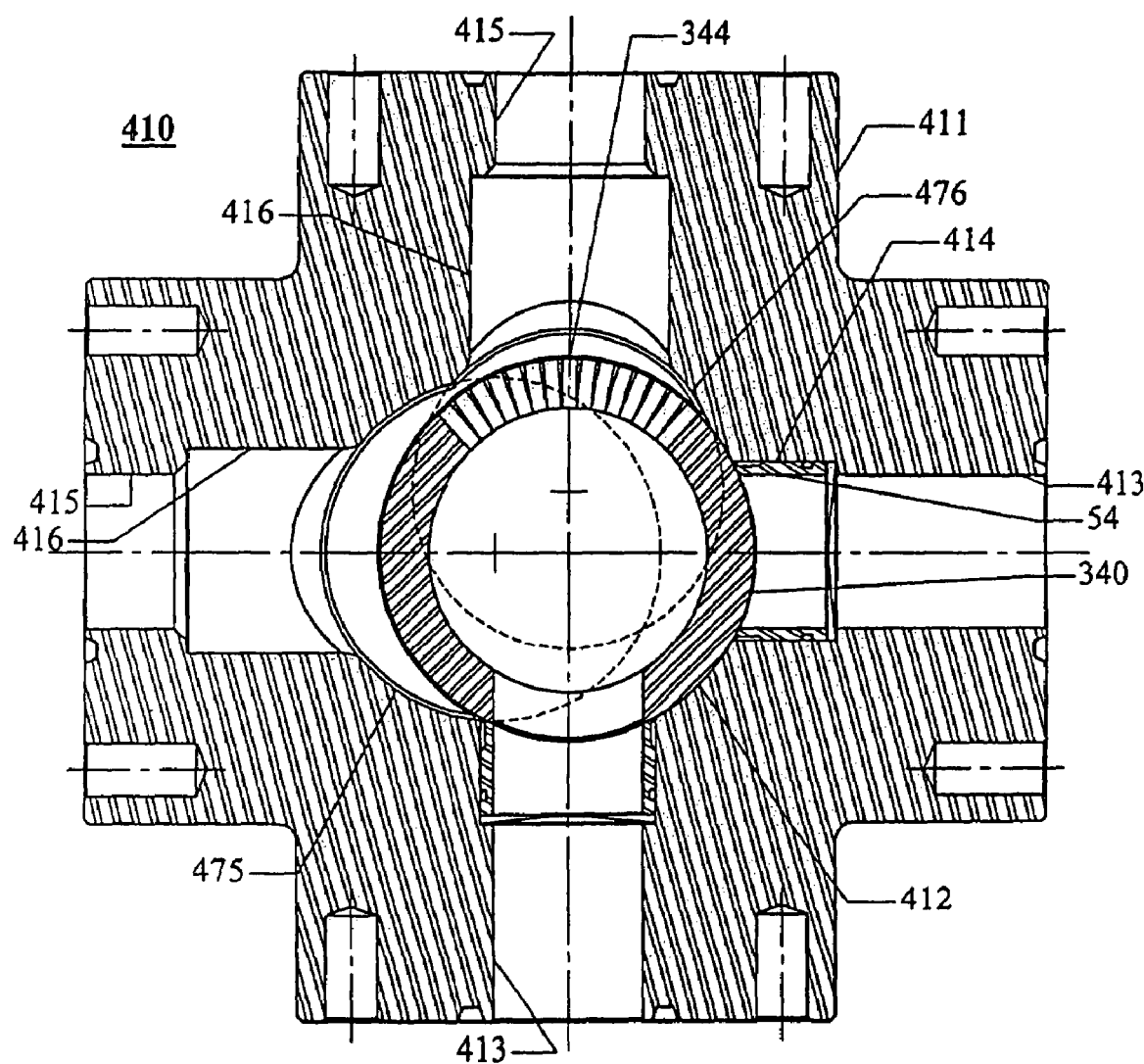
FIG. 18 is a cross-sectional view of the strainer assembly of FIG. 17 taken on the plane of the valve body port axes where the valve plug ports are aligned with the first valve body port pair and the connecting flanges are not attached.

Referring to FIGS. 17 and 18, the alternative strainer assembly 410 is shown in, respectively, vertical axial cross-sectional and horizontal cross-sectional views. The major components of the strainer assembly include body 411, valve plug assembly 340, upstream seals 54, and bottom blind flange 36. The components of the strainer assembly 410 are typically hardened high strength low alloy steel.

The strainer 410, shown in FIGS. 17 and 18, is basically a two position, four way cylindrical plug valve with a modified valve plug to provide a straining function. Strainer 410 is also configured for use with the valve plug 340 and is very similar to strainer 310, with the differences being confined to the configuration of the subbores intersecting their body cavities. This version of the strainer 410 also uses several of the same components as do the strainers 10 and 310 and can be used interchangeably with those strainers. The same component numbers are used to identify identical components in the different versions of the strainer.

The body 411 of strainer assembly 410 is a right circular cylindrical forging, machined component, or fabrication which has a coaxial right circular cylindrical internal valve cavity 412 and four radial branches positioned at 90° spacings. Two right circular cylindrical subbores 475 and 476 intersect body cavity 412. Although the two subbores 475 and 476 have different diameters, they have the same height that is somewhat in excess of the height (parallel to the longitudinal axis of plug 340) of the hole array 344. Each of the subbores is centered on the axis of an exit bore 415, but the two subbores are unequally offset from the axis of body cavity 412. The purpose of the subbores is to provide a flow path for the hole array 344 of the valve plug 340 when the valve plug is aligned with either of the flow passages 415. The faces are stood off from the outer surface of valve plug 340 sufficiently to minimize body erosion.

Each of the radial branches has a right circular cylindrical projected profile and an internal through bore which intersects the cavities 412 and/or subbores 475 and 476. Each pair of coaxial branches has an entry bore 413 on one branch and an exit bore 415 on the opposite branch, wherein typically both bores have the same diameter. The interior ends of entry bores 413 are counterbored to provide upstream seal bores 414, while the interior ends of exit bores 415 are counterbored to provide flow convergence chambers 416. Stem hole 417 is a circular bore penetrating from the exterior of body 411 to the internal cavity 412 and which is coaxial with the body cylindrical axis. Multiple drilled and tapped holes 23 are provided in an array around the stem hole 417 on the upper transverse end of the body 411 so that an actuator 70 can be mounted thereon. Either a manual or a powered actuator can be utilized.

Thrust bearing cavity 418 is a shallow right circular cylindrical bore on the interior end of stem hole 417 that provides clearance for the bearing mount 347 of valve plug 340. Between the bearing cavity 418 and the body cavity 412 is located right circular cylindrical roller bearing cavity 490, which has a female O-ring groove mounting O-ring 382 adjacent the body cavity 412. Annular cylindrical thrust bearing 324 is positioned in bearing cavity 418 into which it closely fits. The thickness of bearing 324 is such that it projects inwardly into the valve cavity 412 beyond the transverse interior end of the cavity. As shown here, an annular disk of polymeric material, such as glass-filled polytetrafluro-ethylene (PTFE or Teflon™) is used, but a sealed rolling element thrust could be substituted if the high pressures caused rotational friction to be excessive.

A large capacity spherical roller bearing 391 is mounted in bearing cavity 490 so that it provides rotational support for the valve plug 340. The space between the bearing and the valve plug is filled with annular cylindrical disk 380, which has a female O-ring groove mounting O-ring 381 in its interior bore. O-ring 381 typically is cut. Disk 380, together with O-rings 381 and 382, provides a dirt exclusion function so that bearing 391 is not contaminated during operation. The exterior end of stem hole 417 has a female O-ring groove in which O-ring 25 is mounted to provide sealing between the valve stem 345 and the stem hole 417. Optionally, a valve stem packing assembly or cartridge such as used in a commercial gate valve or ball valve can be fitted to the upper end of the stem hole 417.

The exterior transverse end of each of the radial branches of body 411 is provided with a seal ring groove 21 and a bolt hole circle consisting of drilled and tapped holes 20 identical to those of strainer 10, where the seal ring groove and the bolt hole circle are concentric with the entry or exit bore of that branch. The seal ring groove 21 is configured to hole a deformable annealed stainless steel high pressure sealing ring 33 of the American Petroleum Institute type BX, RX, or R configuration, as determined by the design pressure capabilities of the equipment. The size of the sealing ring 33 is consistent with the size of the entry 413 or exit bore 415 and the required pressure rating of the strainer 410. The bolt hole circle 20 has a hole and thread size and circle diameter consistent with the sealing ring and required pressure rating of the strainer body 411.

A flow flange 30 may be mounted onto each of the four radial branches of body 411 for interconnection of the strainer assembly 410 to its support flow system, as in the case of strainers 10 and 310, but for clarity no flanges 30 are shown in FIGS. 17 and 18. A sealing ring 33 and an array of studs 31 engaged in holes 20 may be used with nuts 32 for rigidly and sealingly attaching each flange 30 to the body 411.

The bottom transverse end of body 411 is provided with a regular array of drilled and tapped holes 22 to provide a bolt hole circle for the mounting of the bottom blind flange 36 which serves to close the cavity 412 of the body 411 of the strainer assembly 410. Each of the tapped holes 22 is provided with a threaded stud 37 that mounts a hex nut 38 for retaining the bottom flange 36. The upper transverse end of the body 411 is also provided with an array of drilled and tapped mounting holes 23 concentric with the axis of body 411 so that an actuator can be mounted on the strainer assembly 410.

As before, the bottom flange 36 is of right circular cylindrical construction with a reduced diameter concentric right circular cylindrical interior projection comateable with the interior bore of cavity 412 of body 411 and having an external central thickened section on its exterior side. Flange 36 has a male O-ring groove mounting O-ring 39 on its upper interior end so that sealing is provided between the interior projection of bottom flange 36 and the cavity 412 of the body 411. Alternatively, the connection of the bottom flange 36 to the body 411 also may be sealed with a metal sealing ring. The flange portion of bottom flange 36 has a regular array of bolt holes in a circular pattern so that the studs 37 and nuts 38 can be used to mount the bottom flange to the body 411 of strainer assembly 410.

OPERATION OF THE INVENTION

The arrangements shown in the drawings of this document can be varied from the examples shown without departing from the spirit of the present invention. Valve plugs 40 and 240 can be interchanged without any alteration in basic function or operational procedures. In particular, the physical layout of the dual strainer system 100 can be arranged differently than shown in FIGS. 11 and 12. Similarly, deleting one or adding more strainer assemblies can vary the flow circuit schematics shown in FIGS. 7 to 10. All of the gate valves could be actuated either manually or by actuators. Other types of valves, such as plug valves or ball valves, could be substituted for the gate valves shown. Likewise, the operational sequence can be varied somewhat from what is described herein without departing from the spirit of the invention.

The strainer 10 shown in FIGS. 1 to 6B typically would be used in a system 100 wherein the porting and relative size of the strainer are larger than the other items in the flow circuit. This enlargement serves to reduce the pressure drop of the strainer and to provide more flow passages in the hole array 44 or 244 so that the occurrence of a given level of partial plugging does not necessitate overly frequent backwashing cycles. The structural arrangement of the strainer 10 offers the advantages of simpler construction of body 11 and less susceptibility to flow erosion and impairment of operation due to silt buildup.

The two possible normal flow paths of the strainer assembly 10 are identical, so that either one could be utilized as the normal flow path of the strainer or the backwashing flow path. By proper physical arrangement of the flow circuitry layout of the strainer system 100 shown in FIGS. 7 to 10, the bodies 11 of the lefthand and righthand strainer assemblies 10 could be interchanged when their primary flow paths become marginal because of flow erosion. In such an event, the former primary flow path through an interchanged body would become the secondary (backwashing) flow path and vice versa.

The provision of the thrust bearing 24 minimizes the frictional resistance due to unbalanced pressure forces on the valve stem 45 during turning of the valve plug assembly. Additionally, the valve plug 40 or 240 is generally exposed to a transverse fluid pressure gradient from its normal flow passages when being rotated. The provision of valve plug bearings 50 reduces frictional resistance to rotation from that source. The valve seal assemblies 54 and 60 serve both to prevent sediment buildup around the valve plug and to prevent short-circuiting the intended flow path for the strainer assembly 10. The valve plug O-rings 51 further minimize the tendency of sediment to collect around the exterior of the valve plug assembly 40 or 240.

In order to filter or strain larger particulates, i.e., those having dimensions larger than the size of the holes in the hole arrays 44 or 244 of the valve plug assemblies 40 or 240, respectively, the valve plug assembly is rotated so that flow enters on the left and exits on the right as seen in FIG. 2. With the valve plug in that normal flow position, flow enters the cavity 42 by way of entry port 43 or enters cavity 242 by way of entry port 243 of the valve plug assembly 40 or 240, respectively.

Particulates passed through by the piping system enter the interior of the valve plug. Larger particulates are retained inside the valve plug cavity, while the remainder of the fluid and smaller particulates pass through the hole array 44 or 244 and on into the piping system of the strainer system 100. Because the hole array 44 or 244 represents a flow restriction, a flow rate dependent pressure drop will occur as fluid passes through the hole array. The result is appreciable turbulence inside the bore 62 of the downstream seal assembly 60. However, since the bore 62 is either hardfaced or the downstream seal body 61 constructed entirely of a hard material, and the emergent flow paths are spaced away from the surface of the bore 62, erosive tendencies of the well fluid impinging on the downstream seal assembly 60 are avoided. For flow induced wear, the length of seal body 61 is selected to permit sufficient dissipation of the turbulence before the exiting flow enters the exit bore 15 of the body 11 of the strainer assembly 10.

When the valve plug is rotated 90 degrees from the position shown in FIG. 2, then the flow is blocked through the flow branches previously open and flow is enabled through the flow branches previously blocked. This condition of the strainer can be seen in FIG. 3, where flow is blocked for the vertical direction in that view, but is possible for the horizontal direction.

When it is desired to backwash the strainer assembly 10, reverse flow is applied, so that for the view shown in FIG. 2, flow would be from right to left. In such a situation, the plugged holes in the hole array 44 or 244 of the valve plug assembly 40 or 240, respectively, are typically washed clean. The particulates entrapped during normal straining flow in the valve plug interior cavity 42 or 242 would then either remain in the cavity or be washed downstream out of the cavity.

In order to clean or refurbish the strainer assembly 10 while it is still physically positioned in the strainer system 100, the strainer is first isolated by closing all the valves on its four possible flow paths. For example, for the lefthand strainer assembly 10 shown in FIG. 7, valves 103, 109, 108, and 139 would all be closed in order to ensure safety. The bottom flange 36 would then be removed after the stud nuts 38 were removed, so that the body cavity 12 of the strainer body 11 and the valve plug interior cavity 42 or 242 are accessible. Trash can then be readily removed. If it is necessary to remove the valve plug assembly 40 or 240, the actuator would be detached from the valve stem 45 or 245 and then the valve plug pressed from the strainer body 11. The upstream and downstream seal assemblies, 54 and 60 respectively, can then be removed if necessary. Reassembly only requires a reversal of these procedures.

The basic flow conditions for the dual strainer system are shown in the schematic FIGS. 7 to 10. For FIG. 7, normal straining flow is occurring in the lefthand branch of the system. Unless noted, all valves in the system are then closed. Flow enters from the well at inlet 101 and then passes through open valve 103 into lefthand strainer assembly 10, where it passes through and is strained of larger particulates by the valve plug assembly 40 or 240 of the lefthand strainer assembly. Flow exiting from the lefthand strainer passes through outlet line 105 and open valve 109, through outflow cross fitting 130 and branch fitting 131 to the main choke 132 and thence to the tank 155. No flow is occurring in the righthand side of the flow circuit at this time. At such a time, the flushing tank 137 may be simultaneously charged with strained fluid by opening flushing system entry valve 136 while lefthand 139 and righthand branch flushing valve 140 are closed. After the flushing tank 137 is filled, the flushing system branch entry valve 136 is reclosed.

Figure 8:
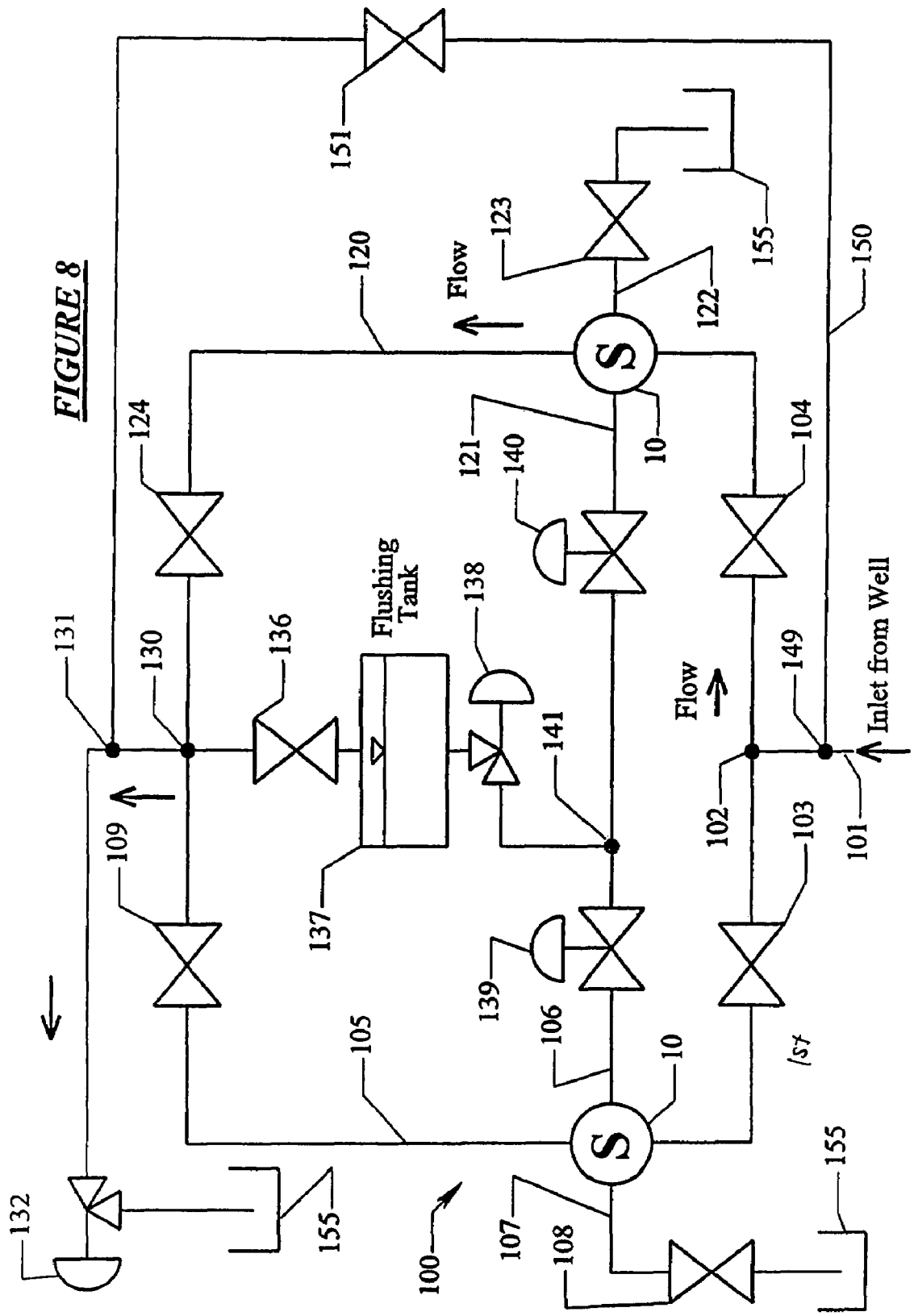
FIG. 8 is a schematic diagram of the flow circuit of FIG. 7 showing the system configured to flow normally through the second strainer assembly.

For FIG. 8, normal straining flow is occurring in the righthand branch of the system. Unless noted, all valves in the system are then closed. Flow enters from the well at inlet 101 and then passes through open valve 104 into righthand strainer assembly 10, where it passes through and is strained of larger particulates by the valve plug assembly 40 or 240 of the righthand strainer assembly. Flow exiting from the righthand strainer passes through outlet line 120 and open valve 124, through outflow cross fitting 130 and branch fitting 131 to the main choke 132 and thence to the tank 155. No flow is occurring in the lefthand side of the flow circuit at this time. Again, at such a time, the flushing tank 137 may be simultaneously charged with strained fluid by opening flushing system entry valve 136 while lefthand 139 and righthand branch flushing valve 140 are closed. After the flushing tank 137 is filled, the flushing system branch entry valve 136 is reclosed.

Figure 9:
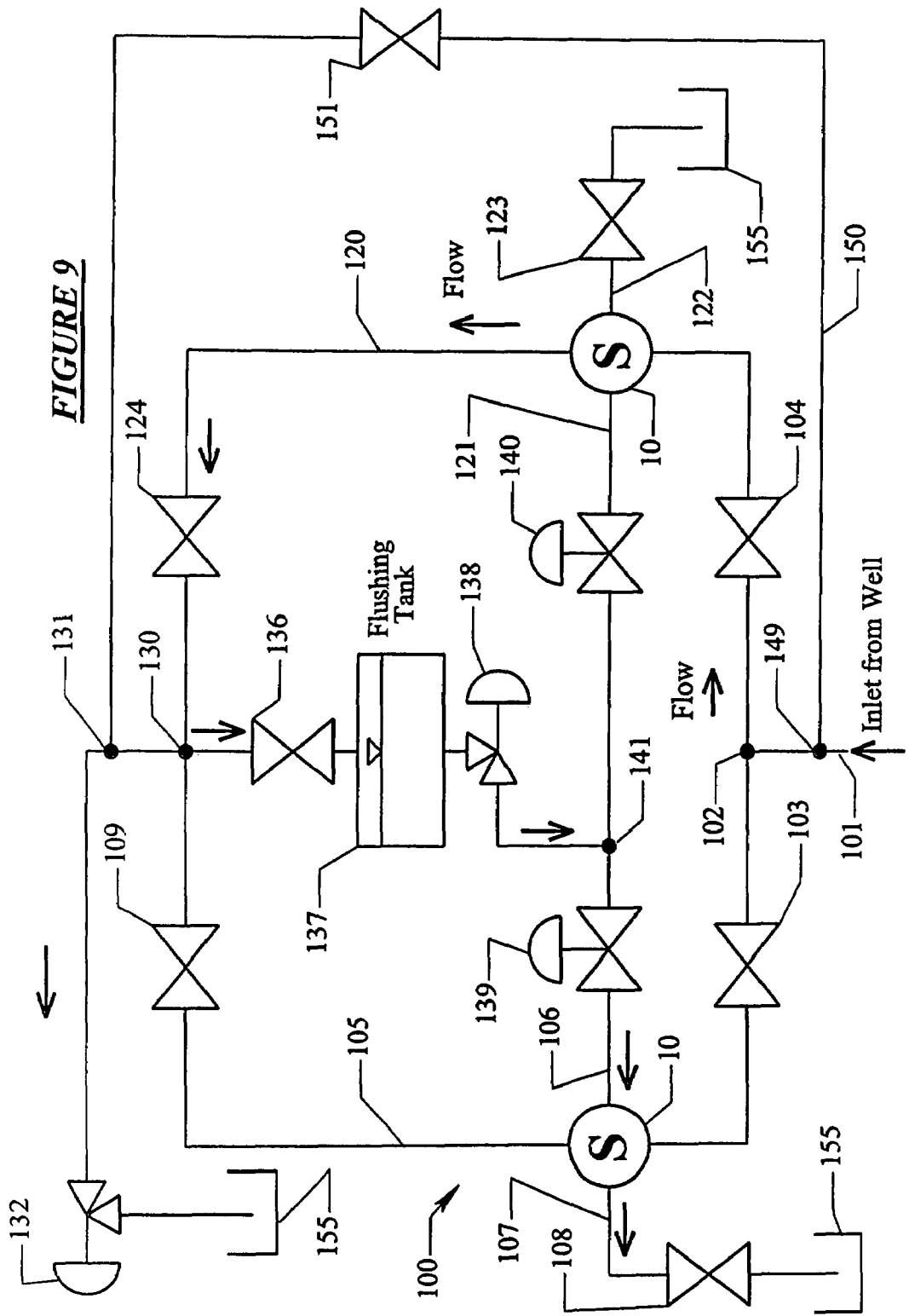
FIG. 9 is a schematic diagram of the flow circuit of FIG. 7 showing the system flowing normally through the second strainer assembly while the first strainer assembly is being backwashed.

When the lefthand strainer assembly 10 is being backflushed as shown in FIG. 9, the righthand side of the circuit is flowing as described for FIG. 8. The valve plug assembly 40 or 240 of the lefthand strainer is rotated so that flow will enter from its strainer side, which will be on its right as shown in FIG. 9. At that time, lefthand backwashing outlet valve 108 is opened, backwashing choke 138 is preadjusted, and then actuated lefthand flushing valve 139 is opened. If tank 137 is an accumulator, the backwashing can occur without the opening of the flushing system branch entry valve 136. Flow pressure drops across the strainer 10 can be monitored in order to ascertain if backwashing is complete. The backwash flow passes to the tank 155 through outlet 107 and valve 108. If desired, valve 136 can also be opened to provide a sustained period of backwashing. Upon completion of backwashing, the valve positions are returned to the condition described above for FIG. 8.

Figure 10:
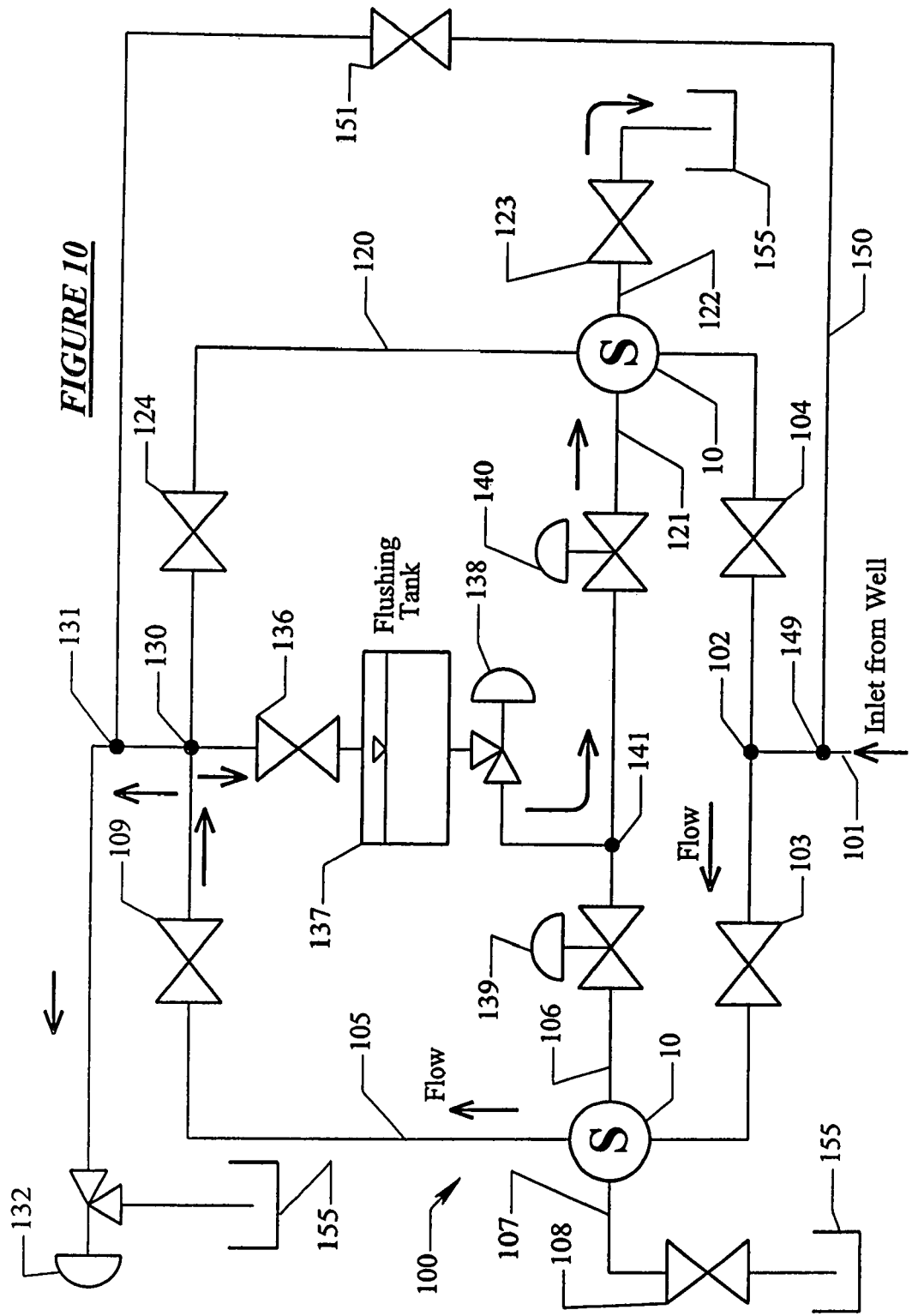
FIG. 10 is a schematic diagram of the flow circuit of FIG. 7 showing the system flowing normally through the first strainer assembly while the second strainer assembly is being backwashed.

When the righthand strainer assembly 10 is being backflushed as shown in FIG. 10, the lefthand side of the circuit is flowing as described for FIG. 7. The valve plug assembly 40 or 240 of the righthand strainer is rotated so that flow will enter from its strainer side, which will be on its left as shown in FIG. 10. At that time, righthand backwashing outlet valve 123 is opened, backwashing choke 138 is preadjusted, and then actuated righthand flushing valve 140 is opened. If tank 137 is an accumulator, the backwashing can occur without the opening of the flushing system branch entry valve 136. Flow pressure drops across the strainer 10 can be monitored in order to ascertain if backwashing is complete. The backwash flow passes to the tank 155 through outlet 122 and valve 123. If desired, valve 136 can also be opened to provide a sustained period of backwashing. Upon completion of backwashing, the valve positions are returned to the condition described above for FIG. 7.

Either of the strainer assemblies 10 shown in FIGS. 7 to 10 can be serviced in line by closing all of its access valves, even while the other side of the system is flowing. For example, the lefthand strainer assembly 10 can be safely serviced if it is isolated by the closure of valves 103, 109, 139, and 108. Flow bypassing around the straining circuits is not described in a drawing, but is accomplished by isolating the strainer system by means of closure of valves 103, 104, 109, 124, and 136, while opening bypass valve 151.

The operation of the alternative strainer assemblies 310 and 410, both of which utilize alternative valve plug 340, is substantially identical to that of the strainer 10, with which they may be interchanged. The primary differences are that the valve plug 340 is supported by a rolling element bearing 391 on its upper end and no downstream seal assemblies 60 are used. Functionally, the bodies 311 and 411 typically would be selected to be smaller than body 11, since for a given size body strainers 310 and 410 provide more flow area in their hole arrays 344 than is the case for strainer 10. Alternative strainer 410 differs from strainer 310 only in the configuration of their subbores 375, 376 and 475, 476, respectively. The configuration of strainer 410 can be used whenever body flow erosion is not a problem, so that interchanging of the normal flow path and the backwashing flow path is not necessary to prolong service life.

ADVANTAGES OF THE INVENTION

The strainer assembly of the present invention permits more reliable operation of the critical main choke on an outflowing well. This improved reliability is achieved by preventing large particulate matter from constantly impinging the main choke. Such improved choke reliability is desirable both for drilling and for well backflow following fracture treatments.

The ability of the strainer assembly of the present invention to be backwashed in line greatly improves both its functionality and uptime and additionally reduces service requirements. Construction of the strainer assembly is simple and robust, and the unit can be readily serviced in line in the field.

The dual strainer circuit described herein for the present invention enhances overall system reliability beyond that offered by a single strainer assembly by offering a reserve strainer in event of plugging or failure of the other strainer. Further, the backwashing capability of the circuit further enhances system reliability by permitting inline refurbishment of the strainers through backwashing without dismantling the strainers.

The strainer assembly of the present invention can also be installed upstream of other types of fluid system components in order to avoid plugging and impingement damage from large particles, such as production treatment equipment.

Although the present invention and its advantages have been described in detail, it should be understood that various changes, substitutions and alterations can be made herein without departing from the spirit and scope of the invention as defined by the appended claims.

What is claimed is:

1. A flow strainer system for use upstream of a drilling choke comprising:
    (a) a selectably operable first flow branch including a first flow strainer device, the first flow strainer device having
        (i) a first normal through flow passageway,
        (ii) a first reverse flow passageway, and
        (iii) a first valve plug containing a first entry port and a first perforated exit port, wherein the first valve plug is rotatable between a first normal and a first reverse position, wherein when the first valve plug is in the first normal position the first entry port is aligned with the first normal through flow passageway and when the first valve plug is in the first reverse position the first entry port is aligned with the first reverse flow passageway;
    (b) a selectably operable second flow branch including a second flow strainer device, the second flow strainer device having
        (i) a second normal through flow passageway,
        (ii) a second reverse flow passageway, and
        (iii) a second valve plug containing a second entry port and a second perforated exit port, wherein the second valve plug is rotatable between a second normal and a second reverse position, wherein when the second valve plug is in the second normal position the second entry port is aligned with the second normal through flow passageway and when the second valve plug is in the second reverse position the second entry port is aligned with the second reverse flow passageway;
    (c) a selectably operable bypass flow branch;
    (d) an inlet connected to the first flow branch, the second flow branch, and the bypass flow branch; and
    (e) an outlet connected to the first flow branch, the second flow branch, the bypass flow branch, a drilling choke, and a bifurcated backflow branch having a selectably operable fluid connection to the first reverse flow passageway and a selectably operable fluid connection to the second reverse flow passageway.

2. The flow strainer system of claim 1, wherein the backflow branch has a pressure charged flushing tank upstream of the selectably operable connection to the first reverse flow passageway and the selectably operable fluid connection to the second reverse flow passageway.

3. The flow strainer system of claim 1, wherein the first and second reverse flow passageways empty into a storage reservoir.

4. The flow strainer system of claim 1, wherein the first normal through flow passageway has a first inlet flow control valve and the second normal through flow passageway has a second inlet flow control valve.

5. The flow strainer system of claim 4, wherein the first inlet control valve and the second inlet control valve are jointly modulated to control a drop in flow pressure across the first flow strainer device and the second flow strainer device whenever the first and second flow branches are operable.

6. The flow strainer system of claim 1, wherein the first flow strainer device and the second flow strainer device are substantially similar.

7. The flow strainer system of claim 6, wherein the first valve plug is positioned in a cavity of a housing body and wherein the first normal through flow passageway and the first reverse flow passageway are separated by an angle from each other in a plane normal to a rotational axis of the first valve plug.

8. The flow strainer system of claim 7, wherein the first normal through flow passageway and the first reverse flow passageway are separated by 90°.

9. The flow strainer system of claim 1, wherein the first valve plug is rotated between the first normal position and the first reverse position by a first actuator.

10. The flow strainer system of claim 9, wherein the second valve plug is rotated between the second normal position and the second reverse position by a second actuator.

11. The flow strainer system of claim 10, wherein the first actuator and the second actuator are jointly modulated.

12. A flow strainer system for use upstream of a drilling choke comprising:
 (a) a selectably operable first flow branch including a first flow strainer device, the first flow strainer device having
  (i) a first normal through flow passageway,
  (ii) a first reverse flow passageway, and
  (iii) a first valve plug containing a first entry port and a first perforated exit port, wherein the first valve plug is rotatable between a first normal and a first reverse position, wherein when the first valve plug is in the first normal position the first entry port is aligned with the first normal through flow passageway and when the first valve plug is in the first reverse position the first entry port is aligned with the first reverse flow passageway;
 (b) a selectably operable second flow branch including a second flow strainer device, the second flow strainer device having
  (i) a second normal through flow passageway,
  (ii) a second reverse flow passageway, and
  (iii) a second valve plug containing a second entry port and a second perforated exit port, wherein the second valve plug is rotatable between a second normal and a second reverse position, wherein when the second valve plug is in the second normal position the second entry port is aligned with the second normal through flow passageway and when the second valve plug is in the second reverse position the second entry port is aligned with the second reverse flow passageway;
 (c) a selectably operable bypass flow branch;
 (d) an inlet connected to the first flow branch, the second flow branch, and the bypass flow branch;
 (e) a backflow branch having a pressure charged flushing tank upstream of a selectably operable connection to the first reverse flow passageway and a selectably operable fluid connection to the second reverse flow passageway;
 (f) a selectably operable first fluid connection that diverts fluid from the first flow branch into the backflow branch;
 (g) a selectably operable second fluid connection that diverts fluid from the second flow branch into the backflow branch; and
 (h) an outlet connected to the first flow branch, the second flow branch, the bypass flow branch, a drilling choke, and the backflow branch.

13. The flow strainer system of claim 12, wherein the first and second reverse flow passageways empty into a storage reservoir.

14. The flow strainer system of claim 12, wherein the first normal through flow passageway has a first inlet flow control valve and the second normal through flow passageway has a second inlet flow control valve.

15. The flow strainer system of claim 12, wherein the first flow strainer device and the second flow strainer device are substantially similar.

16. The flow strainer system of claim 15, wherein the first valve plug is positioned in a cavity of a housing body and wherein the first normal through flow passageway and the first reverse flow passageway are separated by an angle from each other in a plane normal to a rotational axis of the first valve plug.

17. The flow strainer system of claim 12, wherein the first valve plug is rotated between the first normal position and the first reverse position by a first actuator and the second valve plug is rotated between the second normal position and the second reverse position by a second actuator.

18. The flow strainer system of claim 17, wherein the first actuator and the second actuator are jointly modulated.

19. A flow strainer system for use upstream of a drilling choke comprising:
 (a) a selectably operable bypass flow branch;
 (b) a selectably operable first flow branch including a first flow strainer device, the first flow strainer device having
  (i) a housing body including a central cavity, a valve stem borehole at a first end of the housing, a central axis of the housing body coaxial with the valve stem borehole and passing through the cavity and the first end of the housing body, a first and a second inlet passageway separated by an angle from each other in a plane normal to the central axis, wherein each inlet passageway intersects the central cavity, a first and a second outlet passageway separated by an angle from each other in the same plane as the first and second inlet passageways, wherein the first outlet passageway is contrapositioned from the first inlet passageway and the second outlet passageway is contrapositioned from the second inlet passageway and each outlet passageway intersects the central cavity, and a removable closure mounted on a second end of the housing body, wherein the removal of the closure provides access to the central cavity; and
  (ii) a valve plug positioned within the central cavity of the housing body, the valve plug being rotatable between a first and a second position, the valve plug having a plug body, a plug body central cavity having an opening at a first end of the plug body, a valve stem attached to the plug body at a second end of the plug body, wherein the valve stem traverses the valve stem hole in the housing body, an entry port passing through a first side of the plug body, wherein the entry port is aligned with the first inlet passageway whenever the valve plug is in the first position and the entry port is aligned with the second inlet passageway whenever the valve plug is in the second position, and an exit port comprising a plurality of perforations penetrating through a second side of the plug body opposed to the entry port such that the perforations are aligned with the first outlet passageway whenever the valve plug is in the first position and the perforations are rotated into alignment with the second outlet passageway whenever the valve plug is rotated to the second position;
 (c) a selectably operable second flow branch including a second flow strainer device, wherein the second flow strainer device is substantially similar to the first flow strainer device;
 (d) an inlet connected to the first flow branch, the second flow branch, and the bypass flow branch;
 (e) a backflow branch having a pressure charged flushing tank upstream of a selectably operable connection to the first flow strainer device and a selectably operable fluid connection to the second flow strainer device;

(f) a selectably operable first fluid connection that diverts fluid from the first flow branch into the backflow branch, (g) a selectably operable second fluid connection that diverts fluid from the second flow branch into the backflow branch, and (h) an outlet connected to the first flow branch, the second flow branch, the bypass flow branch, a drilling choke, and the backflow branch.

20. The flow strainer system of claim 19, wherein the first and second inlet passageways are positioned 90° from each other.

* * * * *